United States Patent
Takano et al.

(10) Patent No.: US 8,320,969 B2
(45) Date of Patent: Nov. 27, 2012

(54) COMMUNICATION DEVICE, COMMUNICATION CONTROL METHOD AND COMMUNICATION SYSTEM

(75) Inventors: Hiroaki Takano, Saitama (JP); Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 12/687,972

(22) Filed: Jan. 15, 2010

(65) Prior Publication Data

US 2010/0210221 A1 Aug. 19, 2010

(30) Foreign Application Priority Data

Feb. 13, 2009 (JP) ................................ P2009-032029

(51) Int. Cl.
*H04M 1/00* (2006.01)
(52) U.S. Cl. .................... 455/562.1; 455/25; 455/561
(58) Field of Classification Search .................. 375/259, 375/257; 370/345, 328, 252; 342/377, 372, 342/373; 455/562.1, 25, 561, 67.11
See application file for complete search history.

(56) References Cited

U.S. PATENT DOCUMENTS

| | | |
|---|---|---|
| 2005/0002355 A1 | 1/2005 | Takano |
| 2007/0287384 A1 | 12/2007 | Sadri |
| 2010/0164805 A1* | 7/2010 | Niu et al. ...................... 342/377 |
| 2011/0305236 A1* | 12/2011 | Morioka ........................ 370/345 |
| 2012/0020420 A1* | 1/2012 | Sakoda et al. ................ 375/259 |

FOREIGN PATENT DOCUMENTS

| | | |
|---|---|---|
| JP | 2000-307494 | 11/2000 |
| JP | 2004-032062 | 1/2004 |
| JP | 2007-208341 | 8/2007 |
| JP | 2008-048119 | 2/2008 |
| JP | 2008-113450 | 5/2008 |
| WO | WO 2007-074453 A2 | 7/2007 |
| WO | WO 2007-095354 A2 | 8/2007 |
| WO | WO 2007/146733 A1 | 12/2007 |

OTHER PUBLICATIONS

European Search Report from the European Patent Office in corresponding European Application No. 101527828.1, dated May 23, 2012.

* cited by examiner

*Primary Examiner* — Sujatha Sharma
(74) *Attorney, Agent, or Firm* — Finnegan, Henderson, Farabow, Garrett & Dunner, LLP

(57) ABSTRACT

There is provided a communication device including: a first radio communication unit capable of radio communication in accordance with a first communication method; and a second radio communication unit capable of radio communication in accordance with a second communication method using a higher frequency band than the first communication method, wherein the first radio communication unit transmits an instruction signal instructing to learn a beam directionality to another communication device, and the second radio communication unit transmits a beam reference signal used for learning a beam directionality to said another communication device after completion of transmission of the instruction signal by the first radio communication unit and before reception of a response signal to the instruction signal.

16 Claims, 21 Drawing Sheets

COMMUNICATION DEVICE, COMMUNICATION CONTROL METHOD AND COMMUNICATION SYSTEM

BACKGROUND OF THE INVENTION

1. Field of the Invention

The present invention relates to a communication device, a communication control method and a communication system.

2. Description of the Related Art

A new communication method for enhancing the communication speed of radio communication with use of high-frequency electromagnetic waves called millimeter waves is currently under development. The wavelength of millimeter waves is 10 mm to 1 mm and the frequency of millimeter waves is 30 GHz to 300 GHz, and assignment of a channel in units of GHz is feasible in a 60-GHz band or the like, for example.

Generally, millimeter waves have characteristics that they propagate more straightly and are attenuated by reflection more significantly compared to microwaves. Therefore, a radio communication path in millimeter-wave communication are mainly formed with direct waves or reflected waves reflected once or so. Millimeter waves also have characteristics that a free space propagation loss is large (an electric wave attainment distance is short). Therefore, while radio communication using millimeter waves has an advantage that space division can be performed easier than the case of using microwaves, there is an aspect that a communication distance is short.

In order to compensate for such a weakness of millimeter waves and make use of high-speed radio communication using millimeter waves in a larger variety of scenes, one approach is to add a directionality to antennas of transmitting and receiving devices and aim a transmitting beam and a receiving beam in the direction where a device at the other end of communication is located to thereby lengthen a communication distance. The directionality of a beam can be controlled by mounting a plurality of antennas on transmitting and receiving devices and assigning different weights to the respective antennas, for example. Japanese Unexamined Patent Application Publication No. 2000-307494, for example, discloses a technique of performing radio communication with millimeter waves after exchanging a control signal through a communication medium such as sound waves, infrared rays, light or the like and learning an optimum antenna directionality.

SUMMARY OF THE INVENTION

However, the technique of learning an optimum antenna directionality firstly changes an antenna directionality at the transmitting end each time transmitting and receiving one packet and secondary determines an optimum directionality at the receiving end according to a result of the received packet. In this case, it is necessary to transmit and receive the same number of packets as the number of beam patterns, which increases the time for learning and may cause degradation of the throughput.

In light of the foregoing, it is desirable to provide a novel and improved communication device, communication control method and communication system that enable high-speed learning of an antenna directionality to be used for millimeter-wave communication.

According to an embodiment of the present invention, there is provided a communication device including: a first radio communication unit capable of radio communication in accordance with a first communication method; and a second radio communication unit capable of radio communication in accordance with a second communication method using a higher frequency band than the first communication method, wherein the first radio communication unit transmits an instruction signal instructing to learn a beam directionality to another communication device, and the second radio communication unit transmits a beam reference signal used for learning a beam directionality to said another communication device after completion of transmission of the instruction signal by the first radio communication unit and before reception of a response signal to the instruction signal.

The second radio communication unit may transmit the beam reference signal after a prescribed time period has elapsed from completion of transmission of the instruction signal by the first radio communication unit.

The instruction signal may contain only a header portion of a signal format conforming to the first communication method.

The beam reference signal may be a signal containing plural signal sequences respectively associated with different directionality patterns.

The beam reference signal may be a signal containing plural time slots respectively corresponding to the plural signal sequences.

The beam reference signal may be a signal combining the plural signal sequences in orthogonal or pseudo orthogonal relation with one another.

At least part of transmission processing of a radio signal in accordance with the first communication method and at least part of transmission processing of a radio signal in accordance with the second communication method may be executed using a common circuit.

According to another embodiment of the present invention, there is provided a communication device including: a first radio communication unit capable of radio communication in accordance with a first communication method; and a second radio communication unit capable of radio communication in accordance with a second communication method using a higher frequency band than the first communication method, wherein after the first radio communication unit transmits an instruction signal instructing to learn a beam directionality to another communication device, the first radio communication unit transmits a beam reference signal used for learning a transmitting beam directionality of the second radio communication unit to said another communication device before receiving a response signal to the instruction signal.

The first radio communication unit may further receive a notification signal containing a parameter value for specifying an optimum beam pattern determined based on the beam reference signal from said another communication device, and the second radio communication unit may perform radio communication with said another communication device by using a beam pattern specified by the parameter value contained in the notification signal.

According to another embodiment of the present invention, there is provided a communication device including: a first radio communication unit capable of radio communication in accordance with a first communication method; and a second radio communication unit capable of radio communication in accordance with a second communication method using a higher frequency band than the first communication method, wherein upon receiving an instruction signal instructing to learn a beam directionality, the first radio communication unit determines a certain time point after completion of reception of the instruction signal and before transmission of a response signal to the instruction signal as a reception start time point of a beam reference signal, and the second radio communication unit starts reception of the beam reference signal from the reception start time point determined by the first radio communication unit and determines a parameter value for specifying an optimum beam pattern based on the received beam reference signal.

The reception start time point may be a time point after a prescribed time period has elapsed from completion of reception of the instruction signal by the first radio communication unit.

At least part of reception processing of a radio signal in accordance with the first communication method and at least part of reception processing of a radio signal in accordance with the second communication method may be executed using a common circuit.

According to another embodiment of the present invention, there is provided a communication device including: a first radio communication unit capable of radio communication in accordance with a first communication method; and a second radio communication unit capable of radio communication in accordance with a second communication method using a higher frequency band than the first communication method, wherein upon receiving an instruction signal instructing to learn a beam directionality, the first radio communication unit further receives a beam reference signal transmitted subsequent to the instruction signal and used for learning a transmitting beam directionality to be used for radio communication by the second radio communication unit, and determines a parameter value for specifying an optimum beam pattern based on the received beam reference signal.

The first radio communication unit may determine the parameter value for specifying an optimum beam pattern in accordance with eigenvalue analysis based on the beam reference signal.

According to another embodiment of the present invention, there is provided a communication control method between a transmitting device and a receiving device capable of radio communication in accordance with a first communication method and a second communication method using a higher frequency band than the first communication method, including the steps of: transmitting an instruction signal instructing to learn a beam directionality from the transmitting device to the receiving device in accordance with the first communication method; transmitting a beam reference signal used for learning a beam directionality from the transmitting device to the receiving device in accordance with the second communication method after completing transmission of the instruction signal and before receiving a response signal to the instruction signal; starting reception of the beam reference signal from a prescribed reception start time point determined based on the received instruction signal in the receiving device; and determining a parameter for specifying a beam having an optimum directionality based on the received beam reference signal.

According to another embodiment of the present invention, there is provided a communication system including a transmitting device and a receiving device respectively including: a first radio communication unit capable of radio communication in accordance with a first communication method; and a second radio communication unit capable of radio communication in accordance with a second communication method using a higher frequency band than the first communication method, wherein the first radio communication unit of the transmitting device transmits an instruction signal instructing to learn a beam directionality to the receiving device, the second radio communication unit of the transmitting device transmits a beam reference signal used for learning a beam directionality to the receiving device after completion of transmission of the instruction signal by the first radio communication unit and before reception of a response signal to the instruction signal, upon receiving the instruction signal, the first radio communication unit of the receiving device determines a reception start time point of the beam reference signal based on the instruction signal, and the second radio communication unit of the receiving device starts reception of the beam reference signal from the determined reception start time point and determines a parameter value for specifying an optimum beam pattern based on the received beam reference signal.

According to the embodiments of the present invention described above, it is possible to provide a communication device, a communication control method and a communication system that enable high-speed learning of an antenna directionality to be used for millimeter-wave communication.

DETAILED DESCRIPTION OF THE EMBODIMENT(S)

Figure 1:
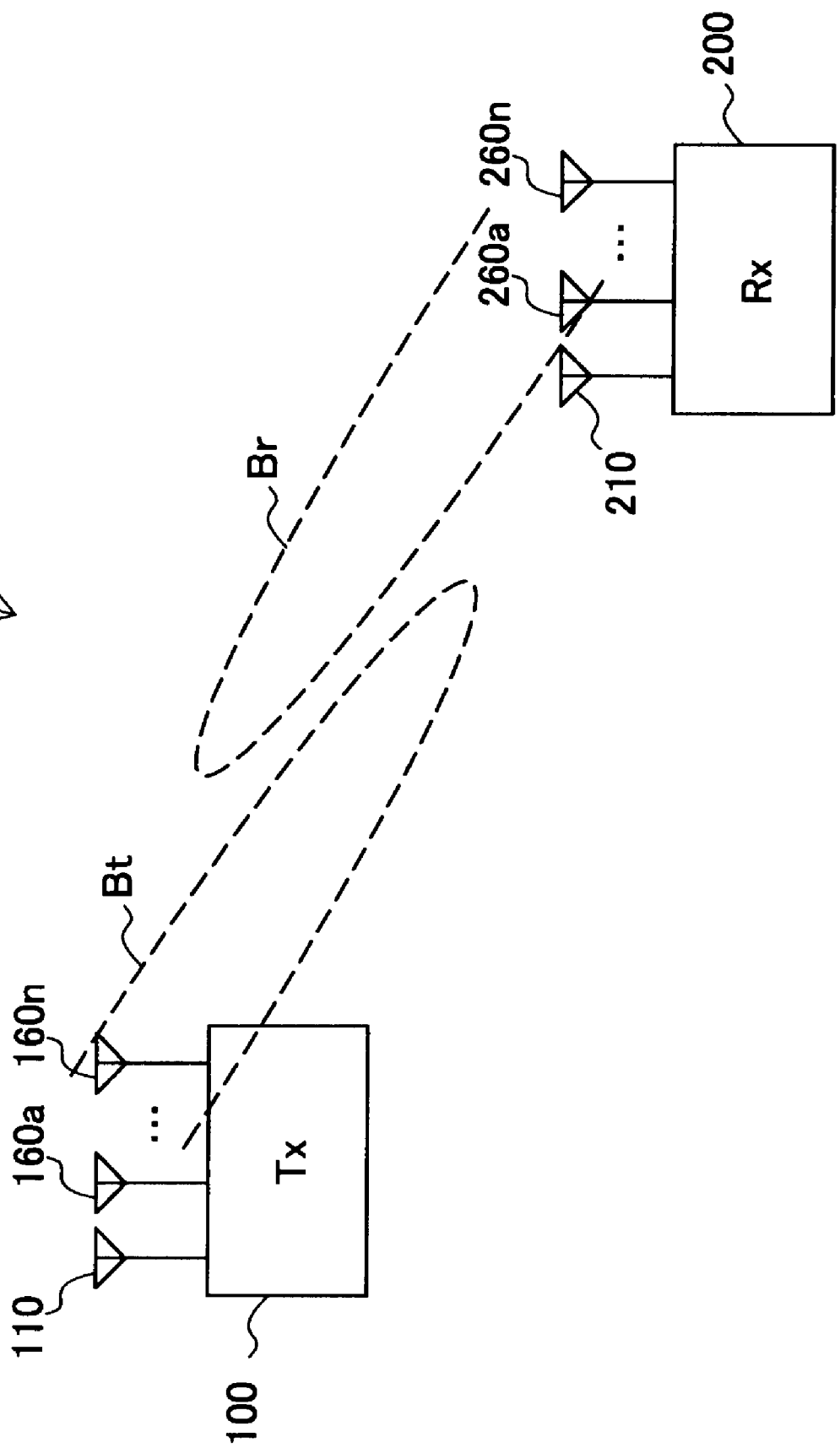
FIG. 1 is a schematic view showing an overview of a communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Overview of Communication System
2. Explanation of First Embodiment
2-1. Configuration of Transmitting Device
2-2. Configuration of Receiving Device
2-3. Example of Signal Transmitting and Receiving Sequence
2-4. Alternative Example
3. Explanation of Second Embodiment
3-1. Configuration of Transmitting Device
3-2. Configuration of Receiving Device
4. Explanation of Third Embodiment
4-1. Configuration of Transmitting Device
4-2. Configuration of Receiving Device
4-3. Example of Signal Transmitting and Receiving Sequence
4-4. Alternative Example
5. Summary

1. Overview of Communication System

FIG. 1 is a schematic view showing an overview of a communication system 1 according to an embodiment of the present invention. Referring to FIG. 1, the communication system 1 includes a communication device 100 and a communication device 200. In this embodiment, the communication device 100 transmits a given signal, which is described later, to the communication device 200 and starts communication with the communication device 200. The communication device 200 receives a signal transmitted from the communication device 100 and starts communication with the communication device 100. Therefore, in this specification, the communication device 100 is referred to as a device at the transmitting end or a transmitting device, and the communication device 200 is referred to as a device at the receiving end or a receiving device, in some cases.

The communication devices 100 and 200 can perform radio communication with each other in accordance with first and second communication methods. The first communication method is a communication method using electromagnetic waves such as microwaves, for example, that propagate less straightly and are attenuated by reflection less significantly compared to the above-described millimeter waves. The first communication method may be a communication method based on wireless LAN (Local Area Network) standards such as IEEE802.11a/b/g, for example. Thus, when performing radio communication in accordance with the first communication method, the communication devices 100 and 200 can communicate with each other without considering the directionality of a transmitting beam and a receiving beam. On the other hand, the second communication method is a communication method using electromagnetic waves that propagate straightly and are attenuated by reflection significantly, which are typified by the above-described millimeter waves. The second communication method may be a communication method based on VHT (Very High Throughput) standards using a 60-GHz band, for example. Thus, when performing radio communication in accordance with the second communication method, it is preferred that the communication devices 100 and 200 transmit and receive radio signals by pointing a transmitting beam and a receiving beam at the device at the other end of communication.

In the example of FIG. 1, the communication device 100 includes an antenna 110 for transmitting and receiving radio signals in accordance with the first communication method and a plurality of antennas 160a to 160n for transmitting and receiving radio signals in accordance with the second communication method. The communication device 200 includes an antenna 210 for transmitting and receiving radio signals in accordance with the first communication method and a plurality of antennas 260a to 260n for transmitting and receiving radio signals in accordance with the second communication method. The communication devices 100 and 200 can perform so-called MIMO (Multi-Input Multi-Output) communication in accordance with the second communication method by using the plurality of antennas 160a to 160n and the plurality of antennas 260a to 260n. By adjusting weights assigned to signals transmitted and received through the respective antennas, the directionality of transmitting and receiving beams at the time of radio communication in accordance with the second communication method is controlled. Referring to FIG. 1, a transmitting beam Bt is directed from the communication device 100 toward the communication device 200, for example. Further, a receiving beam Br is directed from the communication device 200 toward the communication device 100, for example.

The communication devices 100 and 200 may be a PC (Personal Computer), a terminal device such as a cellular phone terminal, a portable information terminal, a music player or a game terminal or a household electrical appliance such as a television set, for example. Further, the communication devices 100 and 200 may be network equipment such as a broadband router or a wireless access point. Furthermore, the communication devices 100 and 200 may be a radio communication module incorporated into such equipment, for example.

2. Explanation of First Embodiment

Configurations of the communication devices according to a first embodiment of the present invention are described hereinafter with reference to FIGS. 2 to 8.

[2-1. Configuration of Transmitting Device]

Figure 2:
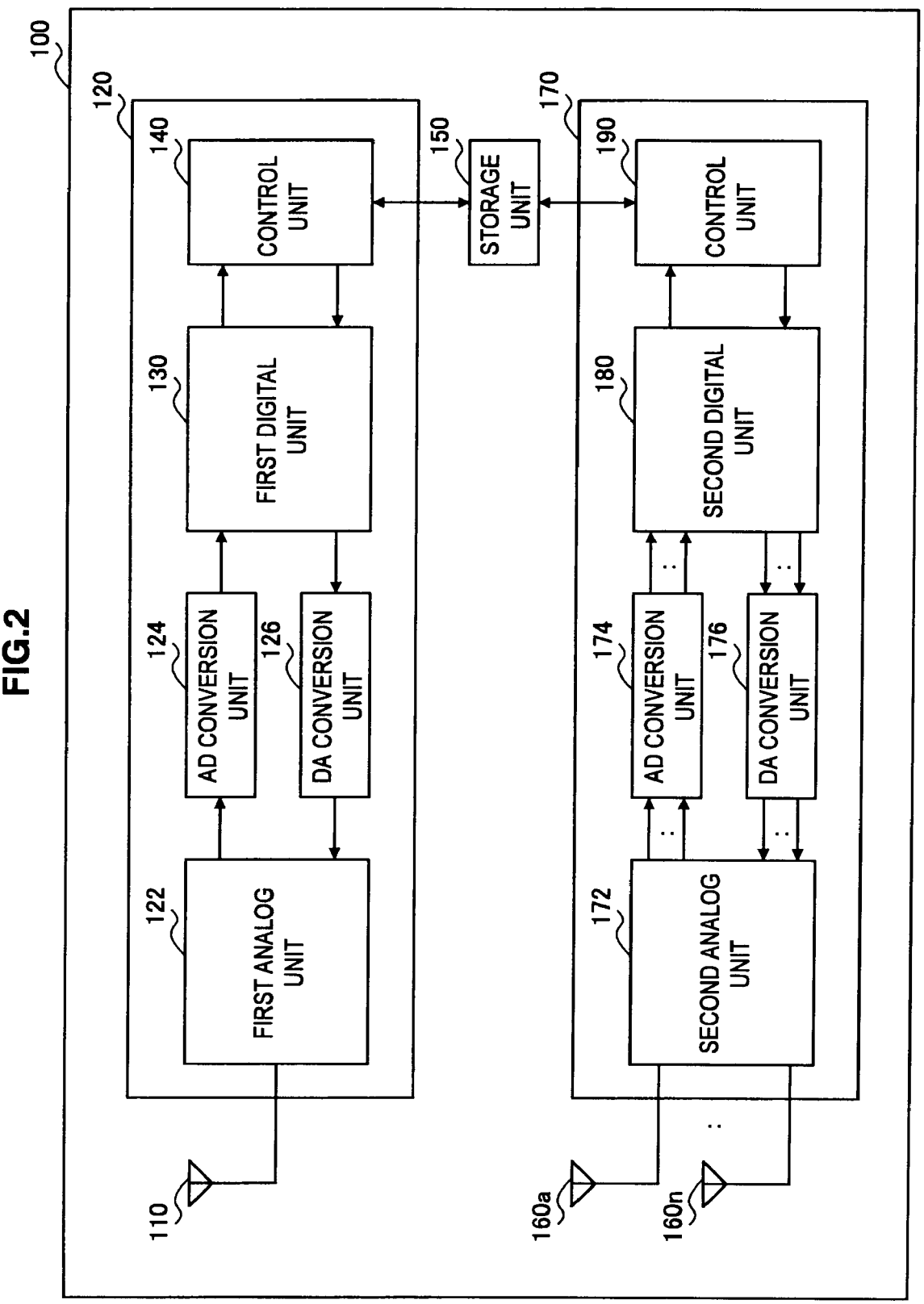
FIG. 2 is a block diagram showing an example of a configuration of a transmitting device according to a first embodiment.

FIG. 2 is a block diagram showing an example of a configuration of the communication device 100 according to the embodiment. Referring to FIG. 2, the communication device 100 includes an antenna 110, a first radio communication unit 120, a storage unit 150, a plurality of antennas 160a to 160n and a second radio communication unit 170. The first radio communication unit 120 includes a first analog unit 122, an AD (Analog-to-Digital) conversion unit 124, a DA (Digital-to-Analog) conversion unit 126, a first digital unit 130 and a control unit 140. The second radio communication unit 170 includes a second analog unit 172, an AD conversion unit 174, a DA conversion unit 176, a second digital unit 180 and a control unit 190.

The antenna 110 is an antenna that is used for radio communication in accordance with the first communication method. The antenna 110 transmits an instruction signal which instructs to learn a beam directionality by using microwaves, for example. Further, the antenna 110 receives a notification signal to obtain notification of an optimum beam pattern and outputs it to the first analog unit 122, for example.

The first analog unit 122 typically corresponds to an RF (Radio Frequency) circuit for transmitting and receiving a radio signal in accordance with the first communication method. Specifically, the first analog unit 122 performs amplification and frequency conversion of a received signal received by the antenna 110 and outputs the signal to the AD conversion unit 124, for example. Further, the first analog unit 122 performs frequency conversion of a transmission signal converted into an analog signal by the DA conversion unit 126 and outputs the signal to the antenna 110.

The AD conversion unit 124 converts an analog received signal input from the first analog unit 122 into a digital signal and outputs it to the first digital unit 130. The DA conversion unit 126 converts a digital transmission signal input from the first digital unit 130 into an analog signal and outputs it to the first analog unit 122.

The first digital unit 130 typically includes a circuit for demodulating and decoding a received signal in accordance with the first communication method and a circuit for encoding and modulating a transmission signal in accordance with the first communication method. If the instruction signal which instructs to learn a beam directionality is input from the control unit 140, the first digital unit 130 encodes and modulates the instruction signal and outputs it to the DA conversion unit 126, for example. Further, if the above-described notification signal is input from the AD conversion unit 124, the first digital unit 130 demodulates and decodes the notification signal and outputs it to the control unit 140, for example.

The control unit 140 controls the overall operation of the first radio communication unit 120 by using an arithmetic unit such as a CPU (Central Processing Unit), for example. The control unit 140 outputs the above-described instruction signal to the first digital unit 130 in response to a request from a given application, for example. Further, if a decoded notification signal is input from the first digital unit 130, the control unit 140 acquires a parameter value for specifying an optimum beam pattern contained in the notification signal and stores it into the storage unit 150.

The storage unit 150 stores a program and a parameter value to be used for communication processing by the communication device 100 by using a recording medium such as semiconductor memory, for example. In this embodiment, the storage unit 150 may store a parameter value for specifying an optimum beam pattern at the time of radio communication by the second radio communication unit 170 in accordance with the second communication method, for example.

The plurality of antennas 160a to 160n are antennas to be used for radio communication in accordance with the second communication method. The plurality of antennas 160a to 160n are typically configured as MIMO antennas. Specifically, the antennas 160a to 160n transmit radio signals which are weighted with prescribed weighting factors by using millimeter waves, for example. Further, the antennas 160a to 160n receive radio signals, which are millimeter waves, and output the signals to the second analog unit 172, for example.

The second analog unit 172 typically corresponds to an RF circuit for transmitting and receiving radio signals in accordance with the second communication method. Specifically, the second analog unit 172 performs amplification and frequency conversion of a plurality of received signals respectively received by the antennas 160a to 160n and outputs the signals to the AD conversion unit 174, for example. Further, the second analog unit 172 performs frequency conversion of a plurality of transmission signals respectively converted into analog signals by the DA conversion unit 176 and outputs the signals to the antennas 160a to 160n.

The AD conversion unit 174 converts a plurality of analog received signals input from the second analog unit 172 into digital signals and outputs them to the second digital unit 180. The DA conversion unit 176 converts a plurality of digital transmission signals input from the second digital unit 180 into analog signals and outputs them to the second analog unit 172.

The second digital unit 180 typically includes a circuit for demodulating and decoding received signals in accordance with the second communication method and a circuit for encoding and modulating transmission signals in accordance with the second communication method.

Figure 3:
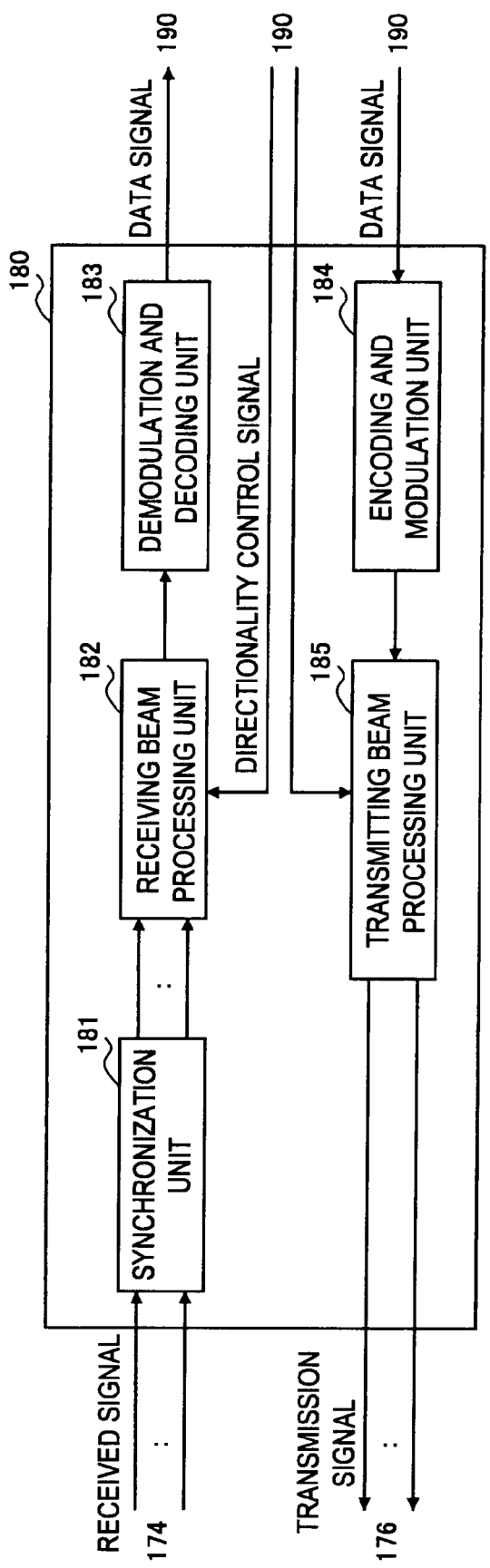
FIG. 3 is a block diagram showing an example of a specific configuration of a second digital unit in the transmitting device according to the first embodiment.

FIG. 3 is a block diagram showing an example of a specific configuration of the second digital unit 180. Referring to FIG. 3, the second digital unit 180 includes a synchronization unit 181, a receiving beam processing unit 182, a demodulation and decoding unit 183, an encoding and modulation unit 184, and a transmitting beam processing unit 185.

The synchronization unit 181 synchronizes the start timing of reception processing on a plurality of received signals received by the plurality of antennas 160a to 160n according to a preamble at the head of a packet, for example, and outputs the signals to the receiving beam processing unit 182.

The receiving beam processing unit 182 performs weighting processing of the plurality of received signals input from the synchronization unit 181 according to uniform distribution or Taylor distribution, for example, and thereby controls the directionality of a receiving beam. The values of the weights used by the receiving beam processing unit 182 are specified by a directionality control signal input from the control unit 190, for example. Alternatively, the receiving beam processing unit 182 may produce a receiving beam by treating the plurality of antennas 160a to 160n as an array antenna.

The demodulation and decoding unit 183 demodulates and decodes the received signals weighted by the receiving beam processing unit 182 according to arbitrary modulation method and encoding method used in the second communication method and acquires a data signal. The demodulation and decoding unit 183 then outputs the acquired data signal to the control unit 190.

The encoding and modulation unit 184 encodes and modulates a data signal input from the control unit 190 according to arbitrary encoding method and modulation method used in the second communication method and generates a transmission signal. The encoding and modulation unit 184 then outputs the generated transmission signal to the transmitting beam processing unit 185.

The transmitting beam processing unit 185 generates a plurality of transmission signals weighted according to uniform distribution or Taylor distribution, for example, from a transmission signal input from the encoding and modulation unit 184 and thereby controls the directionality of a transmitting beam. The values of the weights used by the transmitting beam processing unit 185 are specified by a directionality control signal input from the control unit 190, for example. Alternatively, the transmitting beam processing unit 185 may produce a transmitting beam by treating the plurality of antennas 160a to 160n as an array antenna. The plurality of transmission signals weighted by the transmitting beam processing unit 185 is respectively output to the DA conversion unit 176.

Although not shown in FIG. 3, the second digital unit 180 may further estimate channel characteristics of MIMO channels from the received signals received by the plurality of antennas 160a to 160n and perform channel equalization according to the estimation result.

Referring back to FIG. 2, an example of a configuration of the communication device 100 is further described.

The control unit 190 controls the overall operation of the second radio communication unit 170 by using an arithmetic unit such as a CPU, for example. The control unit 190 makes control to transmit a beam reference signal from the second radio communication unit 170 after completing transmission of the above-described instruction signal from the first radio communication unit 120 and before receiving a response signal to the instruction signal in response to a request from a given application, for example. Further, the control unit 190 acquires a parameter value for specifying an optimum beam pattern from the storage unit 150 and outputs a directionality control signal that contains the acquired parameter value to the receiving beam processing unit 182 or the transmitting beam processing unit 185 of the second digital unit 180 described above. A receiving beam or a transmitting beam at the time of radio communication in accordance with the second communication method by the communication device 100 is thereby directed in the direction where the device at the other end of communication is located.

Figure 4:
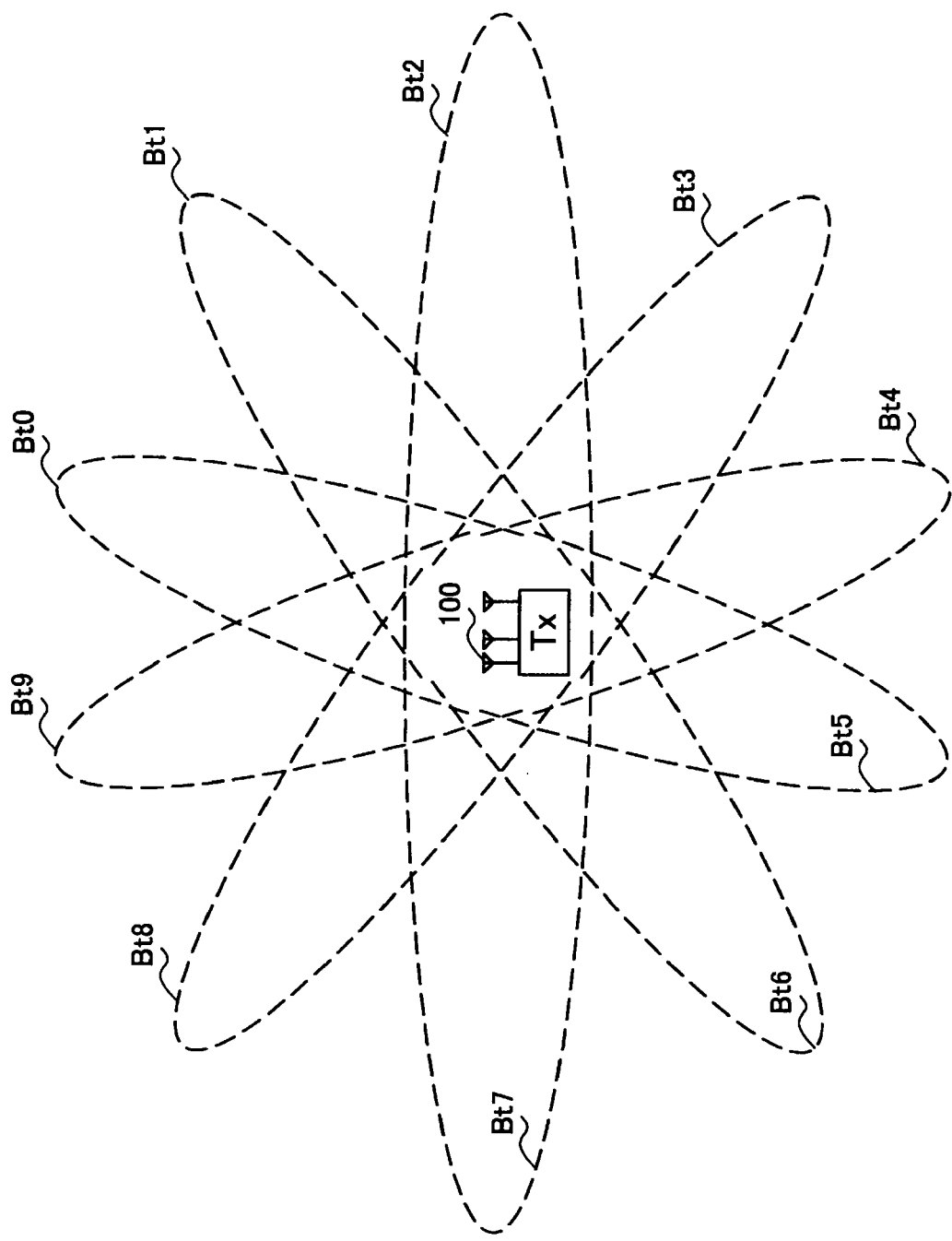
FIG. 4 is an explanatory view showing an example of beam patterns.

FIG. 4 is an explanatory view showing an example of beam patterns which can be created in the communication device 100.

Referring to FIG. 4, ten transmitting beam patterns Bt0 to Bt9 are shown which can be created in the communication device 100 according to the present embodiment. The transmitting beam patterns Bt0 to Bt9 respectively have directionalities in directions differing by 36 degrees each on a plane where the communication device 100 is located. The transmitting beam processing unit 185 of the communication device 100 can transmit radio signals from the antennas 160a to 160n by using a transmitting beam pattern selected from the ten transmitting beam patterns Bt0 to Bt9 according to the directionality control signal from the control unit 190. Further, receiving beam patterns which can be created in the communication device 100 may be beam patterns similar to the transmitting beam patterns Bt0 to Bt9 shown in FIG. 4. In the storage unit 150 of the communication device 100, weighting factors for the antennas 160a to 160n to create those beam patterns are prestored. It should be noted that the transmitting beam patterns and the receiving beam patterns which can be created in the communication device 100 are not limited such examples. For example, the transmitting beam patterns or the receiving beam patterns having directionalities in various directions on a three-dimensional space may be created.

Figure 5:
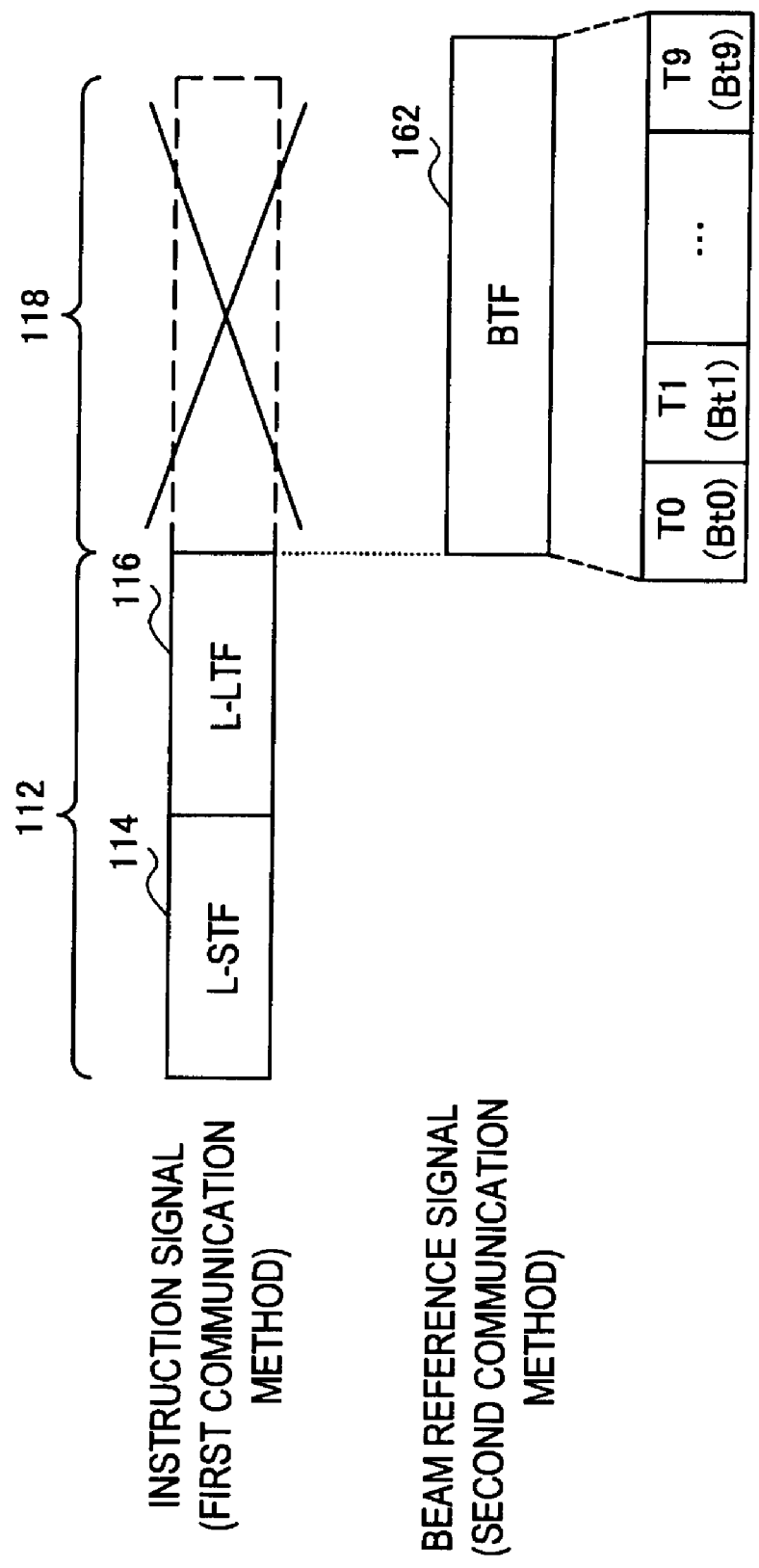
FIG. 5 is an explanatory view showing an example of formats of an instruction signal and a beam reference signal.

FIG. 5 is an explanatory view showing an example of signal formats of the instruction signal and the beam reference signal transmitted from the communication device 100.

Referring to FIG. 5, the instruction signal transmitted from the antenna 110 in accordance with the first communication method contains only a header portion 112 of the signal format conforming to the first communication method. A data portion 118 of the signal format conforming to the first communication method is omitted in the instruction signal. By omitting the data portion 118 in the instruction signal in this manner, it is possible to promptly complete transmission of the instruction signal and promptly start transmission of the beam reference signal in accordance with the second communication method, for example. The header portion 112 has L-STF (Legacy-Short Training Field) 114 and L-LTF (Legacy-Long Training Field) 116, for example. The L-STF 114 principally serves as a preamble and can be used for packet detection, automatic gain control and synchronization processing at the receiving end. The L-LTF 116 is principally used for channel estimation and frequency offset correction.

On the other hand, the beam reference signal transmitted from the antennas 160a to 160n has BTF (Beam Training Field) 162. The BTF 162 is transmitted from the antennas 160a to 160n under control by the control unit 190 at the timing when the data portion 118 would be transmitted in the case where the data portion 118 of the instruction signal described above is not omitted.

In this embodiment, the BTF 162 is composed of ten time slots T0 to T9 respectively corresponding to the transmitting beam patterns Bt0 to Bt9 shown in FIG. 4. In each time slots T0 to T9, a known signal sequence used for learning of a beam at the receiving end is weighted with weighting factors for creating the corresponding transmitting beam patterns Bt0 to Bt9, respectively. Specifically, the directionality of the transmitting beam of the beam reference signal is sequentially changed in the respective time slots T0 to T9. Accordingly, in a receiving device located in the vicinity of the communication device 100, a power level of a received signal has an outstanding value in any time slot of the beam reference signal according to the location, so that an optimum transmitting beam pattern can be determined. The known signal sequence may be a random pattern of BPSK (Binary Phase Shift Keying), for example.

As the instruction signal shown in FIG. 5, a header portion of RTS (Request To Send) or CTS (Clear To Send) based on IEEE802.11a/b/g standards or the like may be used, for example. As an example, a transmitting and receiving sequence of a signal in which the header portion of RTS is the instruction signal is described in further detail later.

A configuration of the communication device 200 that receives the instruction signal and the beam reference signal transmitted in the above manner is described hereinafter.

[2-2. Configuration of Receiving Device]

Figure 6:
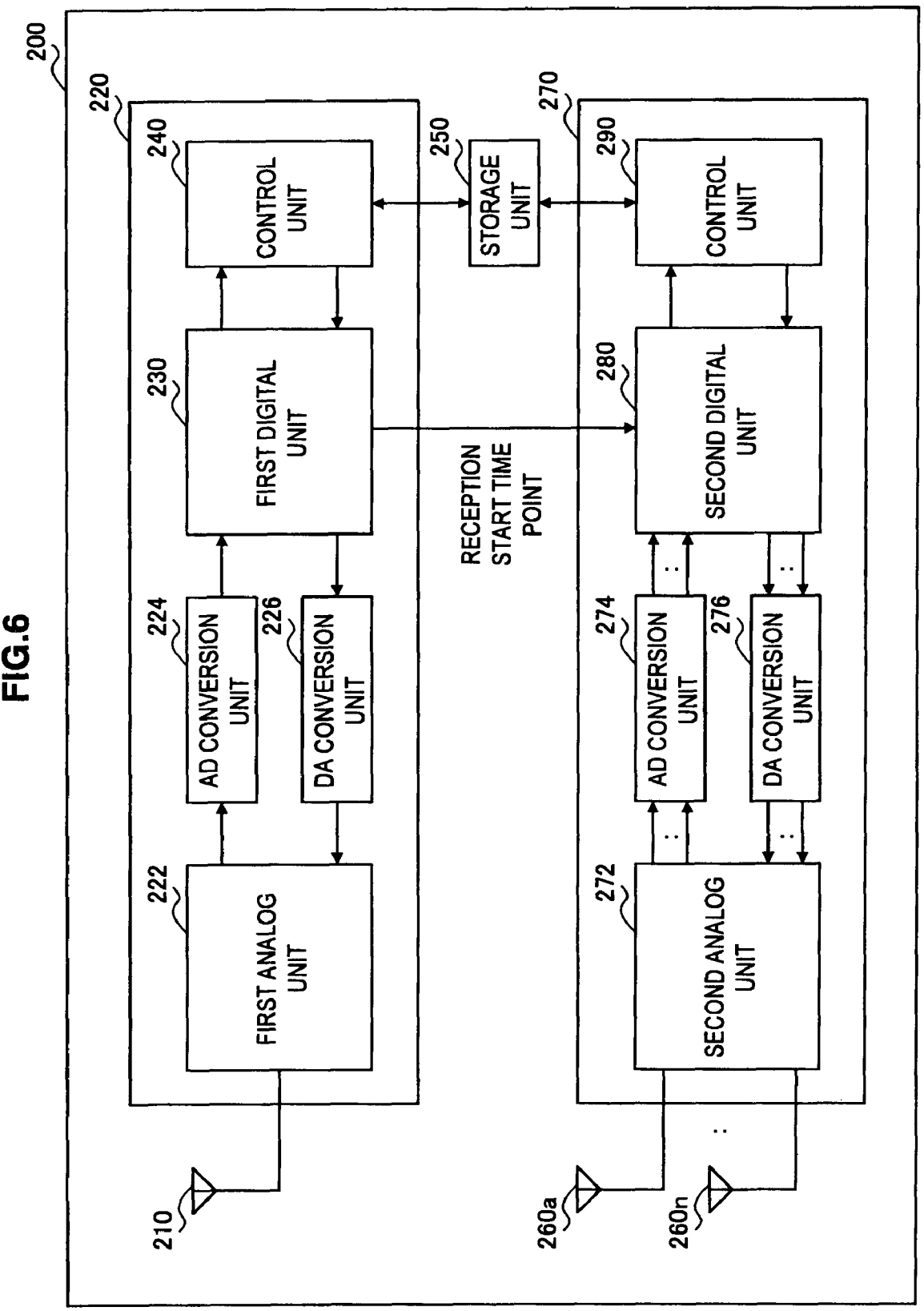
FIG. 6 is a block diagram showing an example of a configuration of a receiving device according to the first embodiment.

FIG. 6 is a block diagram showing an example of a configuration of the communication device 200 according to the first embodiment. Referring to FIG. 6, the communication device 200 includes the antenna 210, a first radio communication unit 220, a storage unit 250, a plurality of antennas 260a to 260n and a second radio communication unit 270. The first radio communication unit 220 includes a first analog unit 222, an AD conversion unit 224, a DA conversion unit 226, a first digital unit 230 and a control unit 240. The second radio communication unit 270 includes a second analog unit 272, an AD conversion unit 274, a DA conversion unit 276, a second digital unit 280 and a control unit 290.

The antenna 210 is an antenna that is used for radio communication in accordance with the first communication method. The antenna 210 receives the above-described instruction signal that is transmitted from the communication device 100, for example. Further, the antenna 210 transmits a notification signal for giving notification of an optimum beam pattern that is determined by processing which is described later, for example.

The first analog unit 222 typically corresponds to an RF circuit for transmitting and receiving a radio signal in accordance with the first communication method. Specifically, the first analog unit 222 performs amplification and frequency conversion of a received signal received by the antenna 210 and outputs the signal to the AD conversion unit 224, for example. Further, the first analog unit 222 performs frequency conversion of a transmission signal converted into an analog signal by the DA conversion unit 226 and outputs the signal to the antenna 210.

The AD conversion unit 224 converts an analog received signal input from the first analog unit 222 into a digital signal and outputs it to the first digital unit 230. The DA conversion unit 226 converts a digital transmission signal input from the first digital unit 230 into an analog signal and outputs it to the first analog unit 222.

The first digital unit 230 typically includes a circuit for demodulating and decoding a received signal in accordance with the first communication method and a circuit for encoding and modulating a transmission signal in accordance with the first communication method. Further, in this embodiment, if the above-described instruction signal is input, the first digital unit 230 acquires synchronization by using the header portion 112 of the instruction signal shown in FIG. 5 and notifies a reception start time point at which reception of the beam reference signal is to be started to the second digital unit 280 of the second radio communication unit 270. For example, it is assumed that a time interval from a given position (e.g. at the head of the L-STF 114, at the head of the L-LTF 116 or at the end of the L-LTF 116 etc.) of the header portion 112 of the instruction signal to the head of the beam reference signal is prescribed in advance between a transmitting device and a receiving device. In such a case, the first digital unit 230 can determine a time point at which the prescribed time interval has elapsed from the time point at which the given position of the header portion 112 of the instruction signal is detected as the reception start time point. Alternatively, for example, data that designates a specific reception start time point may be contained in the header portion 112 of the instruction signal in a transmitting device. In such a case, the first digital unit 230 can acquire the data that designates the reception start time point from the header portion 112 of the instruction signal and determine the reception start time point based on the data. Reception processing of the beam reference signal in the second digital unit 280 is described in further detail later. Then, if a notification signal for notifying the optimum beam pattern determined using the beam reference signal is input from the control unit 240, the first digital unit 230 encodes and modulates the notification signal and outputs it to the DA conversion unit 226, for example.

The control unit 240 controls the overall operation of the first radio communication unit 220 by using an arithmetic unit such as a CPU, for example. Further, if the optimum beam pattern is determined by the second radio communication unit 270, which is described later, the control unit 240 acquires a parameter value that specifies the determined optimum beam pattern from the storage unit 250, adds the parameter value to the above-described notification signal and outputs the signal to the first digital unit 230.

The storage unit 250 stores a program and a parameter value to be used for communication processing by the communication device 200 by using a recording medium such as semiconductor memory, for example. In this embodiment, the storage unit 250 may store a parameter value for specifying an optimum beam pattern at the time of radio communication by the second radio communication unit 270 in accordance with the second communication method, for example. Further, the storage unit 250 stores a parameter value for specifying an optimum beam pattern at the transmitting end that is determined by the second radio communication unit 270, which is described later, for example.

The plurality of antennas 260a to 260n are antennas to be used for radio communication in accordance with the second communication method. The plurality of antennas 260a to 260n are typically configured as MIMO antennas. Specifically, the antennas 260a to 260n transmit radio signals which are weighted with prescribed weighting factors by using millimeter waves, for example. Further, the antennas 260a to 260n receive radio signals, which are millimeter waves, and output the signals to the second analog unit 272, for example.

The second analog unit 272 typically corresponds to an RF circuit for transmitting and receiving radio signals in accordance with the second communication method. Specifically, the second analog unit 272 performs amplification and frequency conversion of a plurality of received signals respectively received by the antennas 260a to 260n and outputs the signals to the AD conversion unit 274, for example. Further, the second analog unit 272 performs frequency conversion of a plurality of transmission signals respectively converted into analog signals by the DA conversion unit 276 and outputs the signals to the antennas 260a to 260n.

The AD conversion unit 274 converts a plurality of analog received signals input from the second analog unit 272 into digital signals and outputs them to the second digital unit 280. The DA conversion unit 276 converts a plurality of digital transmission signals input from the second digital unit 280 into analog signals and outputs them to the second analog unit 272.

The second digital unit 280 typically includes a circuit for demodulating and decoding received signals in accordance with the second communication method and a circuit for encoding and modulating transmission signals in accordance with the second communication method.

Figure 7:
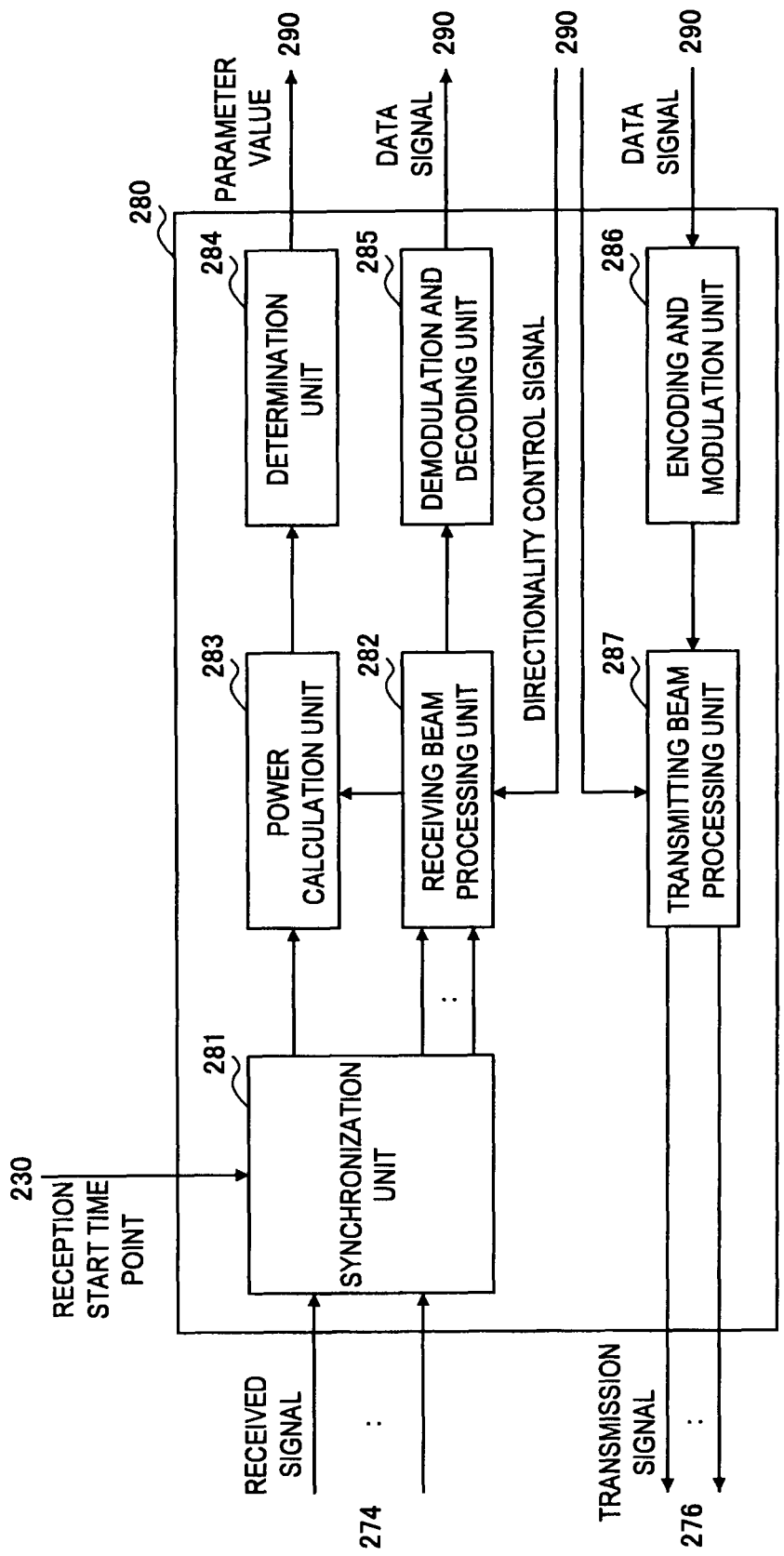
FIG. 7 is a block diagram showing an example of a specific configuration of a second digital unit in the receiving device according to the first embodiment.

FIG. 7 is a block diagram showing an example of a specific configuration of the second digital unit 280. Referring to FIG. 7, the second digital unit 280 includes a synchronization unit 281, a receiving beam processing unit 282, a power calculation unit 283, a determination unit 284, a demodulation and decoding unit 285, an encoding and modulation unit 286 and a transmitting beam processing unit 287.

The synchronization unit 281 synchronizes the start timing of reception processing on a plurality of received signals received by the plurality of antennas 260a to 260n according to a preamble at the head of a packet, for example, and outputs the signals to the receiving beam processing unit 282. Further, if the reception start time point of the beam reference signal is notified from the first digital unit 230 of the first radio communication unit 220 described above, the synchronization unit 281 starts reception of the beam reference signal illustrated in FIG. 5 from the notified reception start time point. Then, the synchronization unit 281 outputs the received beam reference signal to the receiving beam processing unit 282 and instructs calculation of a received power to the power calculation unit 283.

The receiving beam processing unit 282, like the receiving beam processing unit 182 described above, performs weighting processing of the plurality of received signals input from the synchronization unit 281 according to uniform distribution or Taylor distribution, for example, and thereby controls the directionality of a receiving beam. The receiving beam processing unit 282 then outputs the weighted received signal to the power calculation unit 283 and the demodulation and decoding unit 285.

Figure 8:
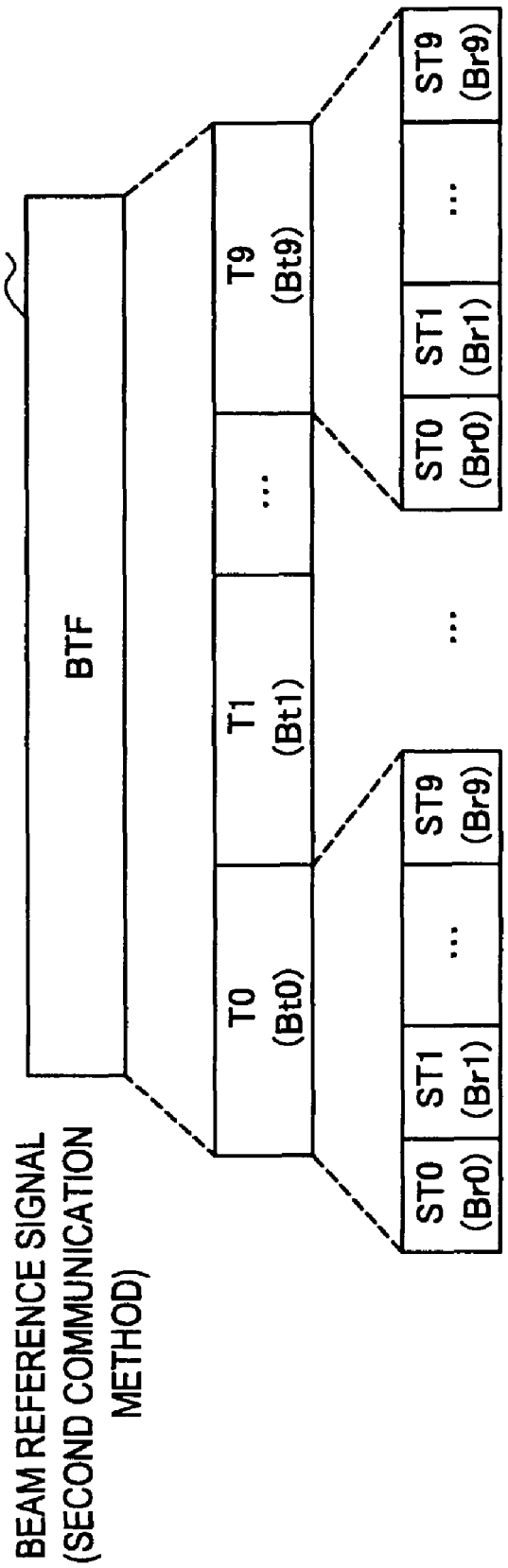
FIG. 8 is an explanatory view to describe directionality control processing.

FIG. 8 is an explanatory view to describe directionality control processing of q receiving beam by the receiving beam processing unit 282.

Referring to FIG. 8, an example of the signal format of the beam reference signal is shown which is transmitted from the communication device 100 in accordance with the second communication method. The beam reference signal contains the BTF 162 composed of ten time slots T0 to T9 respectively corresponding to the transmitting beam patterns Bt0 to Bt9. The receiving beam processing unit 282 further divides each of the time slots T0 to T9 of the beam reference signal into ten sections ST0 to ST9 and performs weighting processing of the received signals with ten receiving beam patterns which are different from one another in the respective sections ST0 to ST9. For example, the first section ST0 of the time slot T0 is associated with the receiving beam pattern Br0, and the second section ST1 of the time slot T0 is associated with the receiving beam pattern Br1 or the like. As a result of such directionality control processing, received signals transmitted and received with total 100 transmitting and receiving beam patterns (10 transmitting beam patterns×10 receiving beam patterns) can be obtained in one beam reference signal.

The power calculation unit 283 shown in FIG. 7 calculates received powers of the respective received signals transmitted and received with the above-described total 100 transmitting and receiving beam patterns in response to an instruction from the synchronization unit 281. Then, the power calculation unit 283 sequentially outputs the calculated received power values to the determination unit 284.

The determination unit 284 determines a parameter value for specifying the optimum transmitting beam pattern and receiving beam pattern based on the received power values input from the power calculation unit 283. The optimum beam pattern is a beam pattern with which a series of received power values input from the power calculation unit 283 for one beam reference signal has a maximum value. The parameter value for specifying the optimum transmitting beam pattern may be any time slot number (T0 to T9) of the BTF 162 shown in FIG. 5 and FIG. 8, for example. Alternatively, the parameter value for specifying the optimum transmitting beam pattern may be a weighting factor to be multiplied with a transmission signal by the transmitting beam processing unit 287, for example. Further, the parameter value for specifying the optimum transmitting beam pattern may be a section number (ST0 to ST9) shown in FIG. 8, for example. Alternatively, the parameter value for specifying the optimum transmitting beam pattern may be weighting factors to be respectively multiplied with a plurality of received signals by the receiving beam processing unit 282, for example. The determination unit 284 outputs the determined parameter value to the control unit 290.

The demodulation and decoding unit 285 demodulates and decodes the received signal weighted by the receiving beam processing unit 282 according to arbitrary modulation method and encoding method used in the second communication method and acquires a data signal. The demodulation and decoding unit 285 then outputs the acquired data signal to the control unit 290.

The encoding and modulation unit 286 encodes and modulates the data signal input from the control unit 290 according to arbitrary encoding method and modulation method used in the second communication method and generates a transmission signal. The encoding and modulation unit 286 then outputs the generated transmission signal to the transmitting beam processing unit 287.

The transmitting beam processing unit 287, like the transmitting beam processing unit 185 described above, generates a plurality of transmission signals weighted according to uniform distribution or Taylor distribution, for example, from the transmission signal input from the encoding and modulation unit 286 and thereby controls the directionality of a transmitting beam. The values of the weights used by the transmitting beam processing unit 287 are specified by a directionality control signal input from the control unit 290, for example. The plurality of transmission signals weighted by the transmitting beam processing unit 287 is respectively output to the DA conversion unit 276.

Although not shown in FIG. 7, the second digital unit 280 may further estimate channel characteristics of MIMO channels from the received signals received by the plurality of antennas 260a to 260n and perform channel equalization according to the estimation result.

Referring back to FIG. 6, an example of a configuration of the communication device 200 is further described.

The control unit 290 controls the overall operation of the second radio communication unit 270 by using an arithmetic unit such as a CPU, for example. Further, if the beam reference signal is received by the second radio communication unit 270, the control unit 290 stores a parameter value for specifying an optimum transmitting beam pattern output from the second digital unit 280 into the storage unit 250. The stored parameter value is notified using a notification signal to a device from which the beam reference signal has been transmitted (e.g. the communication device 100) by the first radio communication unit 220. Further, if a parameter value for specifying an optimum transmitting beam pattern is output from the second digital unit 280, the control unit 290 outputs a directionality control signal that contains the parameter value to the receiving beam processing unit 282 so as to produce a receiving beam having a directionality in the direction of the device at the other end of communication. Further, the control unit 290 may output a directionality control signal that contains the same parameter value as the value used for producing the receiving beam to the transmitting beam processing unit 287 so as to produce a transmitting beam having a directionality in the same direction. It is thereby possible to perform radio communication between the communication device 100 and the communication device 200 in accordance with the second communication method with their directionalities oriented toward the other device, for example.

Instead of notifying the above-described parameter value from the second radio communication unit 270 to the first radio communication unit 220 through the storage unit 250, the parameter value may be notified from the second radio communication unit 270 to the first radio communication unit 220 by using a dedicated signal line, for example.

[2-3. Example of Signal Transmitting and Receiving Sequence]

Figure 9:
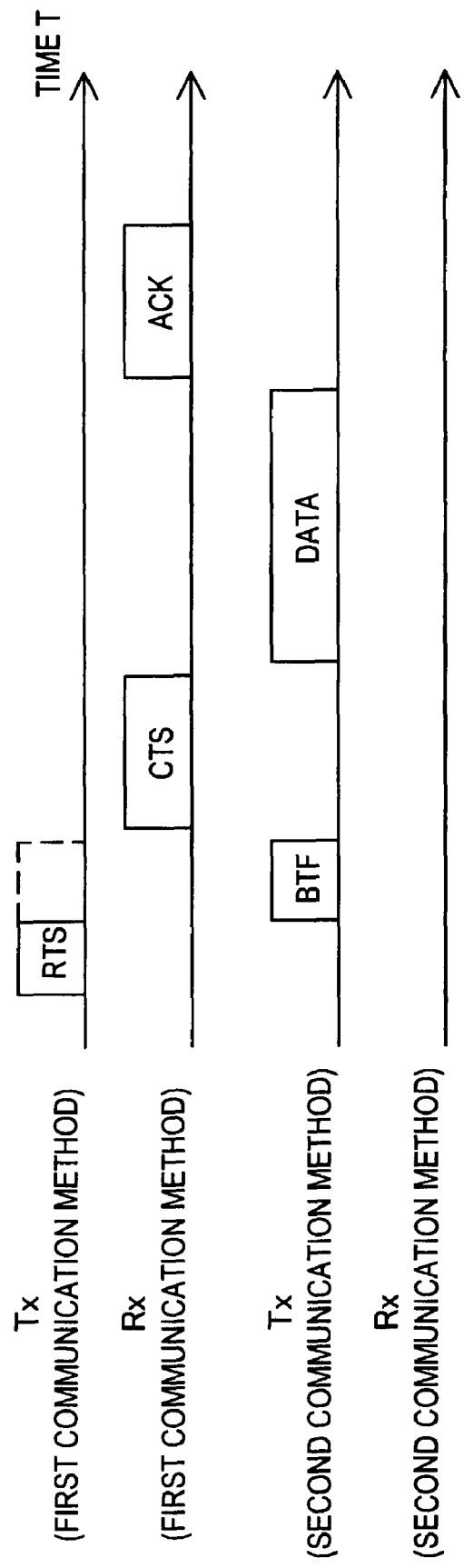
FIG. 9 is an explanatory view showing an example of a signal transmitting and receiving sequence according to the first embodiment.

FIG. 9 is an explanatory view showing an example of a sequence of signals transmitted and received between the communication device 100 and the communication device 200 described above. Referring to FIG. 9, signals transmitted from the communication device 100 (Tx) and the communication device 200 (Rx) are sequentially shown along the time axis.

First, the header portion of RTS in accordance with the first communication method is transmitted from the first radio communication unit 120 of the communication device 100.

The header portion of RTS corresponds to the above-described instruction signal. After transmission of the instruction signal is completed, BTF in accordance with the second communication method is transmitted from the second radio communication unit 170 of the communication device 100. The BTF corresponds to the above-described beam reference signal. An optimum transmitting beam pattern and an optimum receiving beam pattern for transmitting a signal from the communication device 100 to the communication device 200 is thereby determined in the communication device 200.

Next, CTS in accordance with the first communication method is transmitted from the first radio communication unit 220 of the communication device 200. The data portion of the CTS contains a parameter value that specifies an optimum transmitting beam pattern, for example. In this case, the CTS corresponds to the above-described notification signal. The communication device 100 can be thereby notified about the optimum transmitting beam pattern when transmitting a signal to the communication device 200. Note that the CTS transmitted from the communication device 200 to the communication device 100 may also serve as the above-described instruction signal. In this case, only the header portion of CTS (i.e. the instruction signal) is transmitted from the first radio communication unit 220 of the communication device 200, and BTF in accordance with the second communication method is transmitted after completing transmission of the instruction signal. An optimum receiving beam pattern can be thereby determined in the communication device 100 as well.

After that, data is transmitted from the communication device 100 to the communication device 200, and ACK (acknowledgement) is transmitted back from the communication device 200 to the communication device 100. At this time, because the optimum transmitting and receiving beam patterns determined by learning are used between the communication device 100 and the communication device 200, it is possible to transmit and receive data more reliably in accordance with the second communication method even with use of millimeter waves with high straightness and short electric wave attainment distance.

[2-4. Alternative Example]

Figure 10:
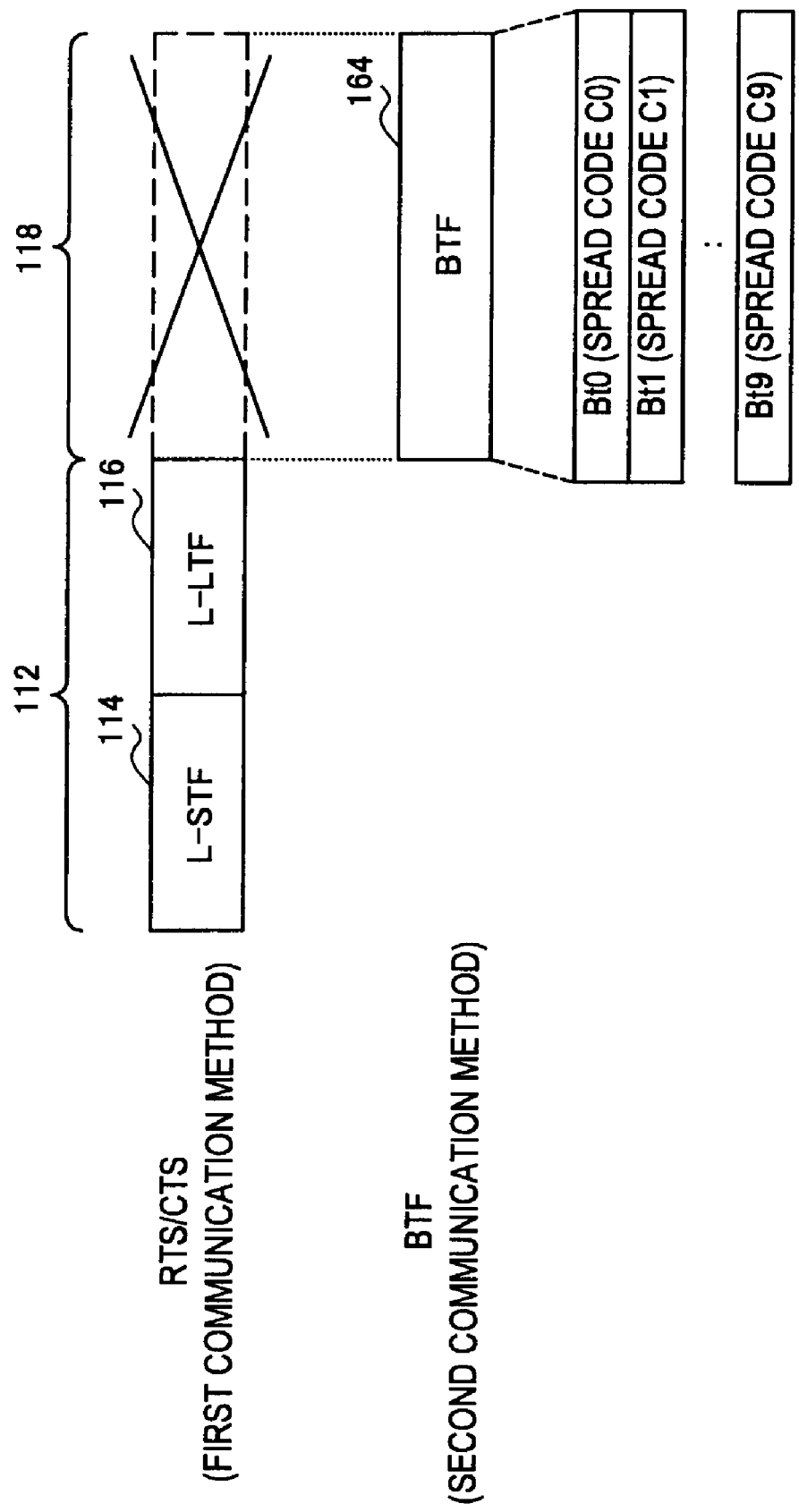
FIG. 10 is an explanatory view showing another example of a format of a beam reference signal according to the first embodiment.

FIG. 10 is an explanatory view showing another example of the signal format of the beam reference signal.

Referring to FIG. 10, the beam reference signal contains BTF 164. The BTF 164 is a signal that combines a plurality of signal sequences in orthogonal or pseudo orthogonal relation with one another, which have different directionality patterns. For instance, in the example of FIG. 10, the BTF 164 is a signal that combines ten signal sequences which are respectively spread by using spread codes C0 to C9 and respectively correspond to the transmitting beam patterns Bt0 to Bt9. With use of the spread codes C0 to C9 that establish the orthogonal or pseudo orthogonal relation, even if signal sequences associated with the transmitting beam patterns Bt0 to Bt9 are combined at the transmitting end, each signal sequence can be extracted from a composite signal at the receiving end. It is thereby possible to calculate a received power for each extracted signal sequence and determine an optimum transmitting beam pattern with which the received power is maximum. In this case, a parameter for specifying a transmitting beam pattern may be a spread code that specifies at least one signal sequence of the above-described signal sequences, an identifier of a signal sequence or the like, for example. The BTF 164, like the BTF 162 shown in FIG. 5, is transmitted in accordance with the second communication method at the timing when the data portion 118 would be transmitted in the case where the data portion 118 of the instruction signal is not omitted. By using such an alternative example, it is possible to shorten the data length of the beam reference signal compared to the case of using the same number of time slots as the number of beam patterns.

The first embodiment of the present invention is described above with reference to FIGS. 2 to 10. According to the present embodiment, the reception start time point of the beam reference signal that is transmitted in accordance with the second communication method (e.g. using millimeter waves etc.) is determined based on the instruction signal transmitted in accordance with the first communication method (e.g. using microwaves or the like etc.). The beam reference signal is transmitted and received at the timing when the data portion omitted in the instruction signal is originally supposed to be received. Then, a parameter value for specifying an optimum beam pattern is determined based on the beam reference signal. It is thereby possible to learn optimum directionalities of transmitting and receiving beams used for radio communication in accordance with the second communication method during a time period in which one packet (e.g. RTS, CTS etc.) can be transmitted and received. Further, in this embodiment, a signal in accordance with the first communication method and a signal in accordance with the second communication method are not simultaneously transmitted, the possibility of an error caused by that signal processing in accordance with different communication methods is performed at the same time is avoided.

3. Explanation of Second Embodiment

As described above, in the first embodiment, a signal in accordance with the first communication method and a signal in accordance with the second communication method are not simultaneously transmitted. Therefore, a part of the circuit may be used in common by the first radio communication unit and the second radio communication unit in each communication device. As a second embodiment of the present invention, a configuration of a device in which a part of the circuit is used in common by the first radio communication unit and the second radio communication unit is described hereinbelow. In this embodiment, a device at the transmitting end (Tx), which is described in relation to FIG. 1, is a communication device 300, and a device at the receiving end (Rx) is a communication device 400.

[3-1. Configuration of Transmitting Device]

Figure 11:
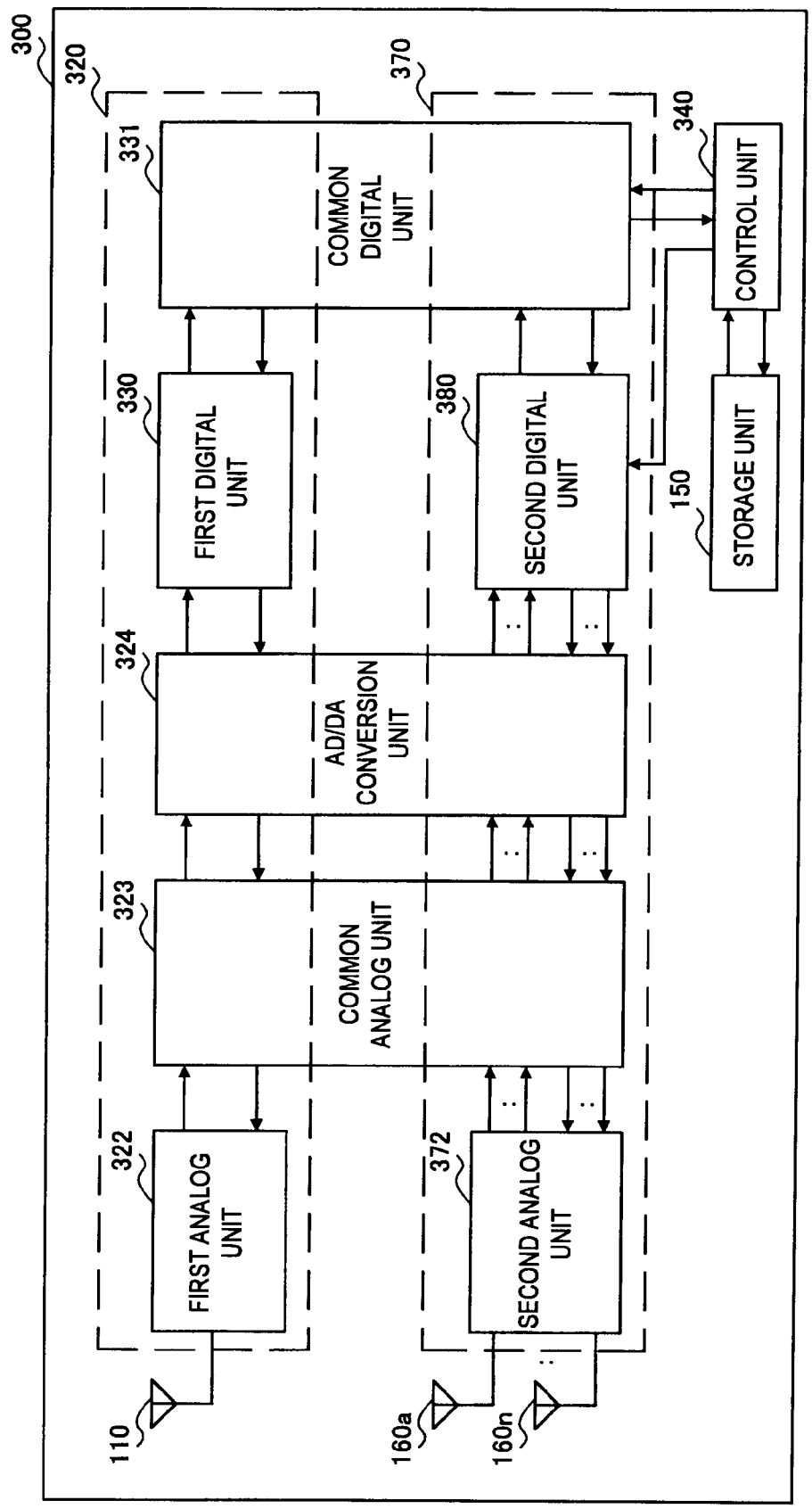
FIG. 11 is a block diagram showing an example of a configuration of a transmitting device according to a second embodiment.

FIG. 11 is a block diagram showing an example of a configuration of the communication device 300 according to the second embodiment of the present invention. Referring to FIG. 11, the communication device 300 includes an antenna 110, a first radio communication unit 320, a control unit 340, a storage unit 150, a plurality of antennas 160*a* to 160*n* and a second radio communication unit 370. The first radio communication unit 320 and the second radio communication unit 370 share the use of a common analog unit 323, an AD/DA conversion unit 324, and a common digital unit 331. Further, the first radio communication unit 320 includes a first analog unit 322 and a first digital unit 330. The second radio communication unit 370 includes a second analog unit 372 and a second digital unit 380.

The first analog unit 322 receives a radio signal in a prescribed frequency band that is used for the first communication method through the antenna 110, performs frequency conversion and outputs the signal to the common analog unit 323, for example. Further, the first analog unit 322 converts a transmission signal input from the common analog unit 323 into a radio signal in a prescribed frequency band that is used for the first communication method and transmits the signal through the antenna 110, for example.

If a received signal is input from the first analog unit 322, the common analog unit 323 amplifies the received signal, performs filtering and then outputs the signal to the AD/DA conversion unit 324, for example. Further, if a transmission signal is input from the AD/DA conversion unit 324, the common analog unit 323 amplifies the transmission signal and outputs the signal to the first analog unit 322, for example.

If an analog received signal is input from the common analog unit 323, the AD/DA conversion unit 324 converts the received signal into a digital signal and outputs it to the first digital unit 330, for example. Further, if a digital transmission signal is input from the first digital unit 330, the AD/DA conversion unit 324 converts the transmission signal into an analog signal and outputs it to the common analog unit 323, for example.

If the digital received signal is input from the AD/DA conversion unit 324, the first digital unit 330 performs reception processing specific to the first communication method, for example. The reception processing specific to the first communication method may be arbitrary processing for which commonality is not achievable between the first communication method and the second communication method among reception processing such as packet synchronization, demodulation and decoding, for example. Next, if the received signal on which the reception processing specific to the first communication method has been performed is input from the first digital unit 330, the common digital unit 331 performs reception processing for which commonality is achieved between the first communication method and the second communication method. For example, if the same encoding method is used between the first communication method and the second communication method, decoding processing among the reception processing can be performed in the common digital unit 331. Then, the common digital unit 331 outputs a data signal acquired as a result of the reception processing to the control unit 340.

If a data signal for the first radio communication unit 320 is input from the control unit 340, the common digital unit 331 performs transmission processing for which commonality is achieved between the first communication method and the second communication method. For example, if the same encoding method is used between the first communication method and the second communication method, encoding processing among the transmission processing can be performed in the common digital unit 331. Next, the first digital unit 330 performs transmission processing specific to the first communication method, for example. The transmission processing specific to the first communication method may be arbitrary processing for which commonality is not achievable between the first communication method and the second communication method among transmission processing such as encoding and modulation, for example. Then, the first digital unit 330 outputs a transmission signal generated as a result of the transmission processing to the AD/DA conversion unit 324. Note that the order of processing in the first digital unit 330 and the common digital unit 331 is not limited to such an example.

The control unit 340 controls the overall operation of the first radio communication unit 320 and the second radio communication unit 370 by using an arithmetic unit such as a CPU, for example. The control unit 340 makes control to transmit the above-described instruction signal from the first radio communication unit 320 in response to a request from a given application, for example. Then, the control unit 340 makes control to transmit the beam reference signal from the second radio communication unit 370 after completing transmission of the instruction signal and before receiving a response signal to the instruction signal, for example. Further, if a decoded notification signal is input from the first digital unit 330, the control unit 340 acquires a parameter value for specifying an optimum beam pattern contained in the notification signal. Then, the control unit 340 outputs a directionality control signal that contains the acquired parameter value to a receiving beam processing unit 382 or a transmitting beam processing unit 385 of the second digital unit 380, which is described later.

The second analog unit 372 receives radio signals in a prescribed frequency band that are used for the second communication method through the antennas 160a to 160n, performs frequency conversion and outputs the signals to the common analog unit 323, for example. Further, the second analog unit 372 converts a plurality of transmission signals input from the common analog unit 323 into radio signals in a prescribed frequency band that are used for the second communication method and transmits the signals through the antennas 160a to 160n, for example.

If a plurality of received signals are input from the second analog unit 372, the common analog unit 323 amplifies the plurality of received signals, performs filtering and then outputs the signals to the AD/DA conversion unit 324, for example. Further, if a plurality of transmission signals are input from the AD/DA conversion unit 324, the common analog unit 323 amplifies the plurality of transmission signals and outputs the signals to the second analog unit 372, for example.

If a plurality of analog received signals are input from the common analog unit 323, the AD/DA conversion unit 324 converts the plurality of received signals into digital signals and outputs them to the second digital unit 380, for example. Further, if a plurality of digital transmission signals are input from the second digital unit 380, the AD/DA conversion unit 324 converts the plurality of transmission signals into analog signals and outputs them to the common analog unit 323, for example.

If a plurality of digital received signals are input from the AD/DA conversion unit 324, the second digital unit 380 performs reception processing specific to the first communication method, for example.

Figure 12:
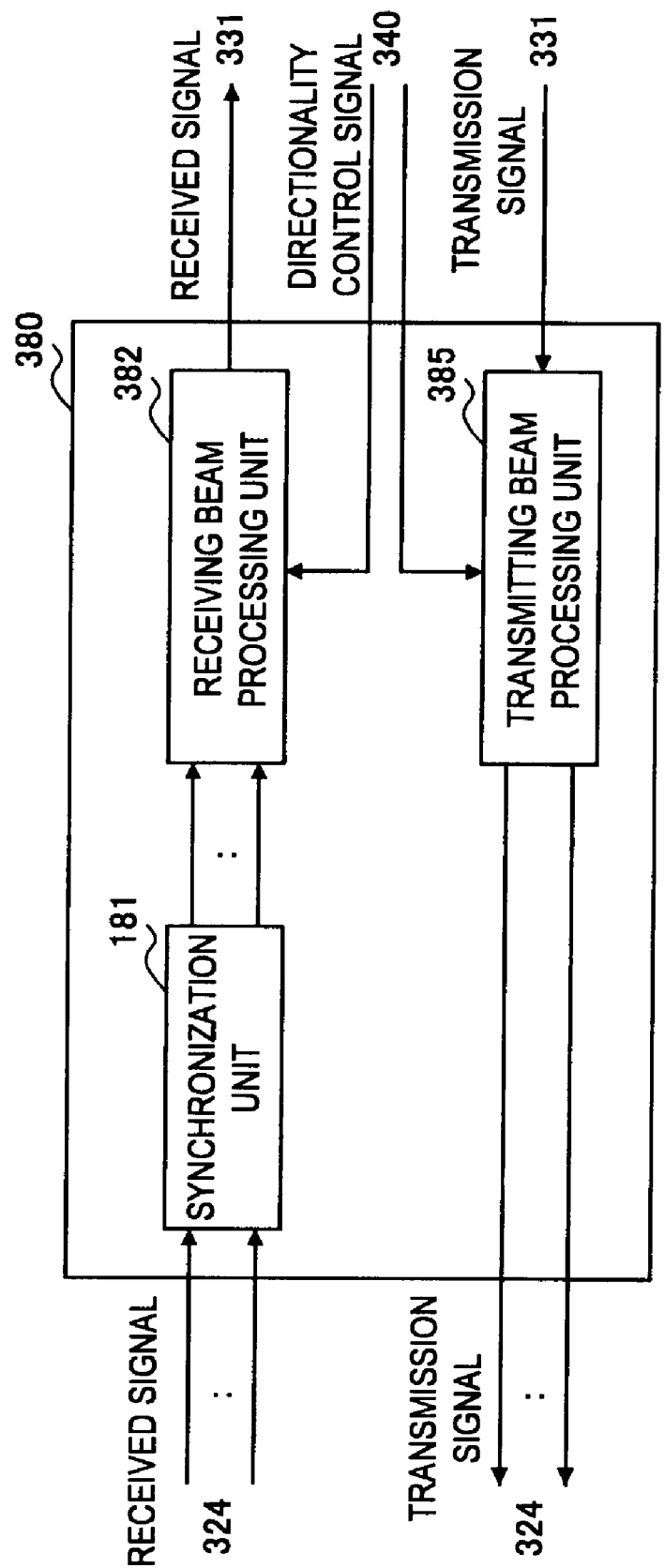
FIG. 12 is a block diagram showing an example of a specific configuration of a second digital unit in the transmitting device according to the second embodiment.

FIG. 12 is a block diagram showing an example of a specific configuration of the second digital unit 380. Referring to FIG. 12, the second digital unit 380 includes a synchronization unit 181, a receiving beam processing unit 382 and a transmitting beam processing unit 385.

The receiving beam processing unit 382 performs weighting processing of the plurality of received signals input from the synchronization unit 181 according to uniform distribution or Taylor distribution, for example, and thereby controls the directionality of a receiving beam. The values of the weights used by the receiving beam processing unit 382 are specified by a directionality control signal input from the control unit 340, for example. Alternatively, the receiving beam processing unit 382 may produce a receiving beam by treating the plurality of antennas 160a to 160n as an array antenna. The received signal weighted by the receiving beam processing unit 382 is output to the common digital unit 331.

The transmitting beam processing unit 385 generates a plurality of transmission signals weighted according to uniform distribution or Taylor distribution, for example, from the transmission signal input from the common digital unit 331 and thereby controls the directionality of a transmitting beam. The values of the weights used by the transmitting beam processing unit 385 are specified by a directionality control signal input from the control unit 340, for example. Alternatively, the transmitting beam processing unit 385 may produce a transmitting beam by treating the plurality of antennas 160a to 160n as an array antenna. The plurality of transmission signals weighted by the transmitting beam processing unit 385 are respectively output to the AD/DA conversion unit 324. In this embodiment, beam patterns created in the communication device 300 may be the beam patterns illustrated in FIG. 4 or other arbitrary beam patterns.

Referring back to FIG. 11, an example of a configuration of the communication device 300 according to the embodiment is further described.

If the weighted received signal is input from the receiving beam processing unit 382 of the second digital unit 380, the common digital unit 331 performs the reception processing for which commonality is achieved between the first communication method and the second communication method, for example. For example, if the same modulation method and encoding method are used between the first communication method and the second communication method, demodulation processing and decoding processing among the reception processing can be performed in the common digital unit 331. Then, the common digital unit 331 outputs a data signal acquired as a result of encoding processing to the control unit 340.

If a data signal for the second radio communication unit 370 is input from the control unit 340, the common digital unit 331 performs transmission processing for which commonality is achieved between the first communication method and the second communication method, for example. If the same modulation method and encoding method are used between the first communication method and the second communication method, for example, encoding processing and modulation processing among the transmission processing can be performed in the common digital unit 331. Then, the common digital unit 331 outputs a transmission signal generated as a result of encoding processing and modulation processing to the transmitting beam processing unit 385 of the second digital unit 380. Note that the order of processing in the second digital unit 380 and the common digital unit 331 is not limited to such an example.

Figure 13:
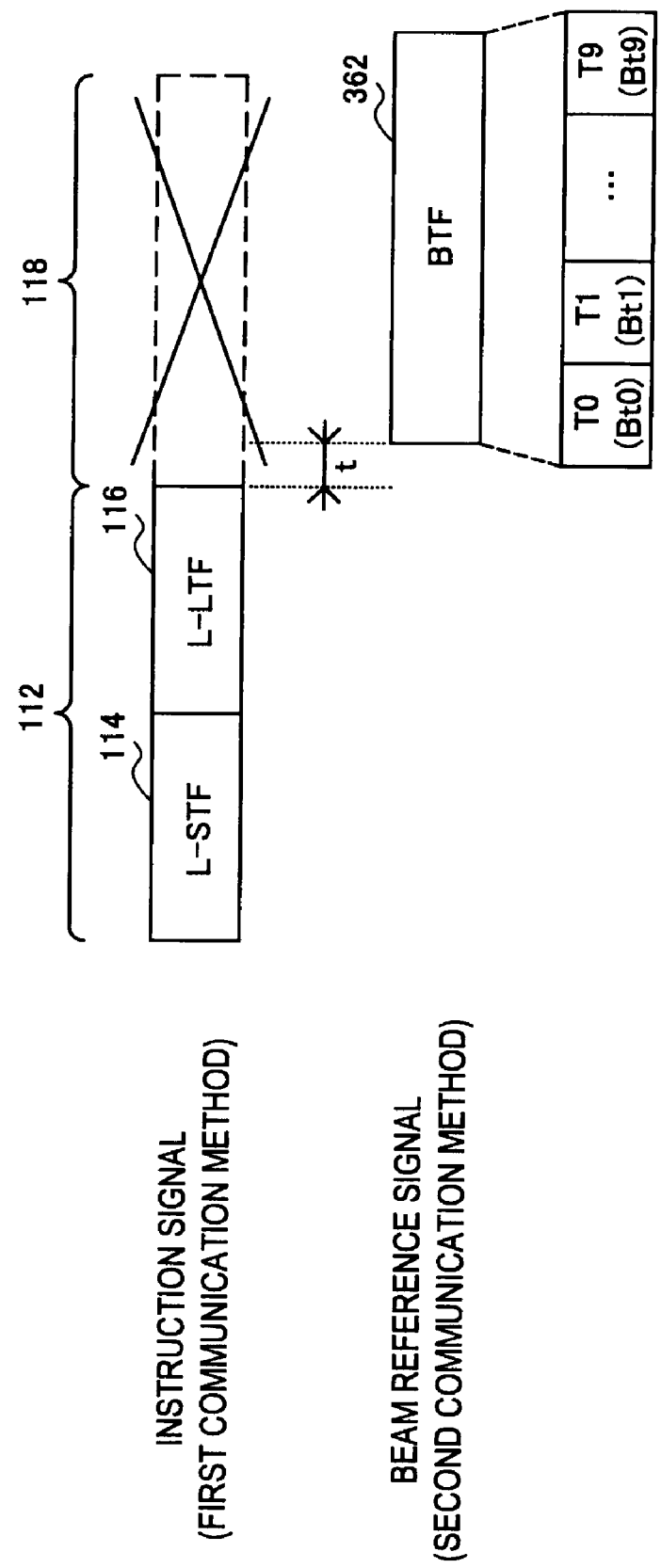
FIG. 13 is an explanatory view to describe the timing of transmitting a beam reference signal according to the second embodiment.

FIG. 13 is an explanatory view to describe the timing of transmitting the beam reference signal according to the embodiment.

Referring to FIG. 13, the instruction signal transmitted from the antenna 110 in accordance with the first communication method contains only a header portion 112 of the signal format conforming to the first communication method, as in the first embodiment. A data portion 118 of the signal format conforming to the first communication method is omitted in the instruction signal.

On the other hand, the beam reference signal transmitted from the antennas 160a to 160n has BTF 362. The BTF 362 is transmitted from the antennas 160a to 160n according to control by the control unit 340 after predetermined time t has elapsed from completion of transmission of the above-described instruction signal from the first radio communication unit 320. During the time t, the communication device 400 that receives the instruction signal and the beam reference signal can switch the operation of the common part of the circuit from an operation for the first communication method to an operation for the second communication method.

The BTF 362 is composed of ten time slots T0 to T9 respectively corresponding to the transmitting beam patterns Bt0 to Bt9 shown in FIG. 4, for example, just like the BTF 162 according to the first embodiment. Accordingly, in the communication device 400, a power level of a received signal has an outstanding value in any time slot of the beam reference signal according to the location, so that an optimum transmitting beam pattern can be determined.

[3-2. Configuration of Receiving Device]

Figure 14:
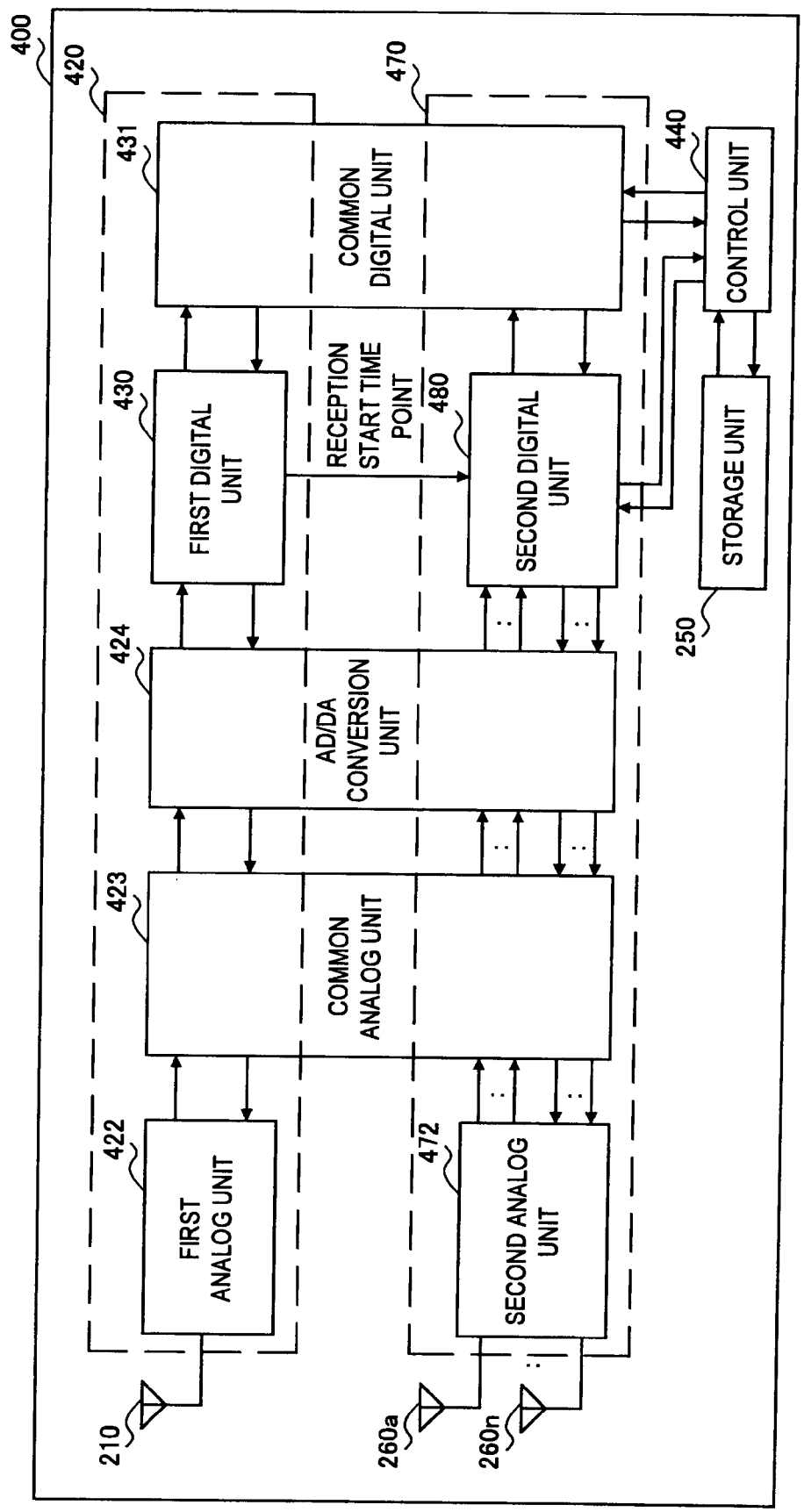
FIG. 14 is a block diagram showing an example of a configuration of a receiving device according to the second embodiment.

FIG. 14 is a block diagram showing an example of a configuration of the communication device 400 according to the second embodiment. Referring to FIG. 14, the communication device 400 includes an antenna 210, a first radio communication unit 420, a control unit 440, a storage unit 250, a plurality of antennas 260a to 260n and a second radio communication unit 470. The first radio communication unit 420 and the second radio communication unit 470 share the use of a common analog unit 423, an AD/DA conversion unit 424, and a common digital unit 431. Further, the first radio communication unit 420 includes a first analog unit 422 and a first digital unit 430. The second radio communication unit 470 includes a second analog unit 472 and a second digital unit 480.

The first analog unit 422 receives a radio signal in a prescribed frequency band that is used for the first communication method through the antenna 210, performs frequency conversion and outputs the signal to the common analog unit 423, for example. Further, the first analog unit 422 converts a transmission signal input from the common analog unit 423 into a radio signal in a prescribed frequency band that is used for the first communication method through the antenna 210, for example.

The common analog unit 423, like the common analog unit 323 of the communication device 300, performs amplification, filtering or the like of a received signal and a transmission signal. Further, the AD/DA conversion unit 424, like the AD/DA conversion unit 324 of the communication device 300, performs conversion between an analog signal and a digital signal.

If a digital received signal is input from the AD/DA conversion unit 424, the first digital unit 430 performs reception processing specific to the first communication method, for example. Next, if the received signal on which the reception processing specific to the first communication method has been performed is input from the first digital unit 430, the common digital unit 431 performs the reception processing for which commonality is achieved between the first communication method and the second communication method, for example. Further, if the above-described instruction signal is input, the first digital unit 430 acquires synchronization by using the header portion 112 of the instruction signal shown in FIG. 13 and notifies a reception start time point at which reception of the beam reference signal is to be started to the second digital unit 480 of the second radio communication unit 470. The reception start time point may be a time point at which the time t shown in FIG. 13 has elapsed from completion of reception of the instruction signal, for example.

If a data signal (e.g. the above-described notification signal etc.) for the first radio communication unit 420 is input from the control unit 440, the common digital unit 431 performs transmission processing for which commonality is achieved between the first communication method and the second communication method, for example. Next, the first digital unit 430 performs transmission processing specific to the first communication method, for example. Note that the order of processing in the first digital unit 430 and the common digital unit 431 is not limited to such an example.

The control unit 440 controls the overall operation of the first radio communication unit 420 and the second radio communication unit 470 by using an arithmetic unit such as a CPU, for example. If the above-described instruction signal is received by the first radio communication unit 420, for example, the control unit 440 switches the operation of the common analog unit 423, the AD/DA conversion unit 424 and the common digital unit 431 to an operation in accordance with the second communication method. Such switch processing can be performed after the instruction signal is received and until reception of the beam reference signal is started (i.e. during the time t shown in FIG. 13). Further, if an optimum beam pattern is determined by the second radio communication unit 470, which is described later, the control unit 440 adds a parameter value that specifies the determined optimum beam pattern to the notification signal and outputs the notification signal to the common digital unit 431 so as to transmit the notification signal from the first radio communication unit 420. Furthermore, the control unit 440 outputs the above-described directionality control signal to the second digital unit 480 and controls a transmitting beam and a receiving beam of the communication device 400.

The second analog unit 472 receives radio signals in a prescribed frequency band that are used for the second communication method through the antennas 260$a$ to 260$n$, performs frequency conversion and outputs the signals to the common analog unit 423, for example. Further, the second analog unit 472 converts a plurality of transmission signals input from the common analog unit 423 into radio signals in a prescribed frequency band that are used for the second communication method and transmits the signals through the antennas 260$a$ to 260$n$, for example.

If a plurality of digital received signals are input from the AD/DA conversion unit 424, the second digital unit 480 performs reception processing specific to the second communication method, for example.

Figure 15:
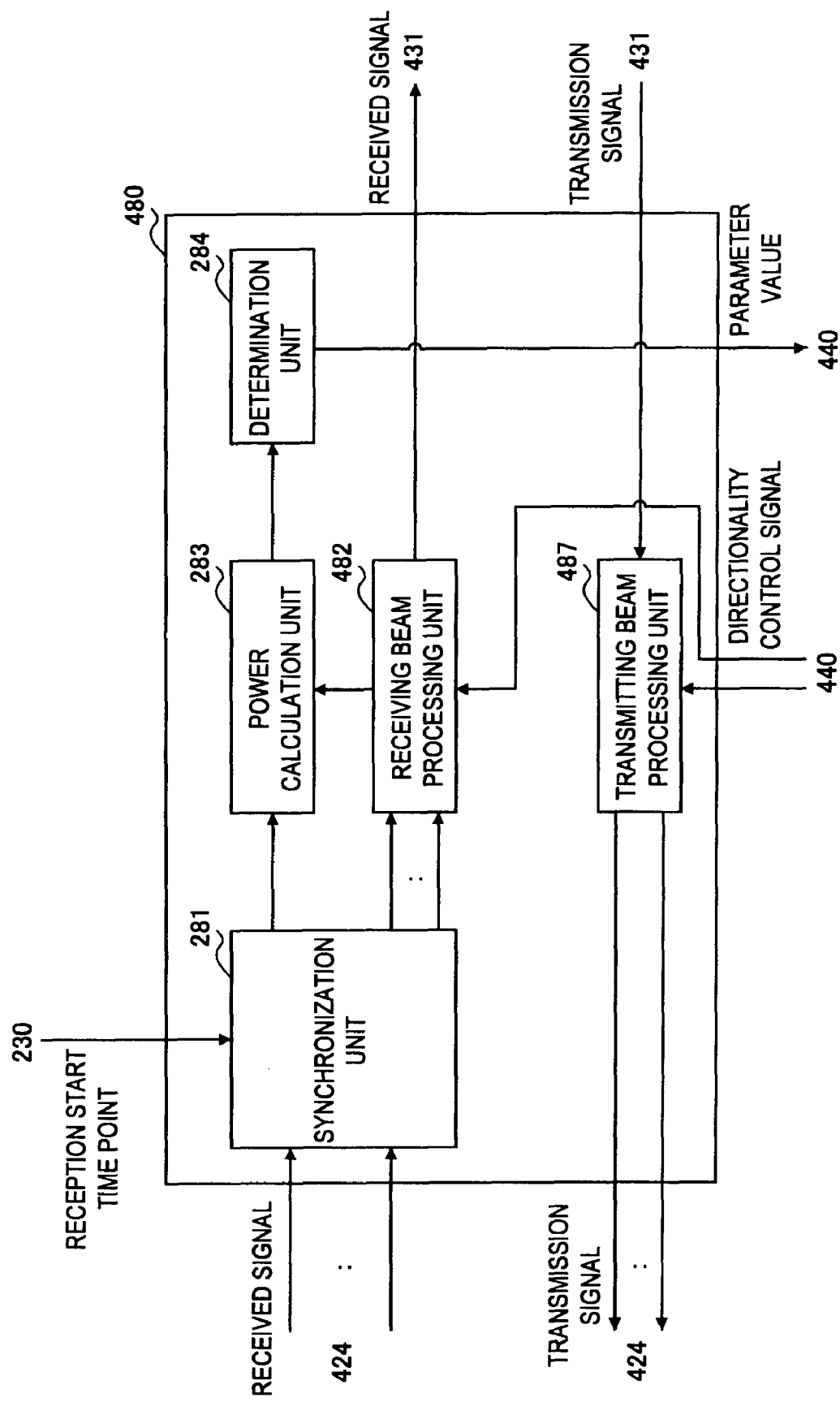
FIG. 15 is a block diagram showing an example of a specific configuration of a second digital unit in the receiving device according to the second embodiment.

FIG. 15 is a block diagram showing an example of a specific configuration of the second digital unit 480. Referring to FIG. 15, the second digital unit 480 includes a synchronization unit 281, a receiving beam processing unit 482, a power calculation unit 283, a determination unit 284 and a transmitting beam processing unit 487.

The receiving beam processing unit 482, like the receiving beam processing unit 382 described above, performs weighting processing of the plurality of received signals input from the synchronization unit 281 according to uniform distribution or Taylor distribution, for example, and thereby controls the directionality of a receiving beam. The receiving beam processing unit 482 then outputs the weighted received signal to the power calculation unit 283 and the common digital unit 431. The directionality control processing of a receiving beam by the receiving beam processing unit 482 may be similar to the processing according to the first embodiment described earlier with reference to FIG. 8.

The transmitting beam processing unit 487, like the above-described transmitting beam processing unit 385 described above, generates a plurality of transmission signals weighted according to uniform distribution or Taylor distribution, for example, from the transmission signal input from the common digital unit 431 and output the signals to the AD/DA conversion unit 424.

The configurations of the devices at the transmitting end and the receiving end according to the second embodiment of the present invention are described above with reference to FIGS. 11 to 15. According to the embodiment, it is possible to learn the directionalities of transmitting and receiving beams used for radio communication in accordance with the second communication method at high speed and further to suppress an increase in circuit scale by the shared use of a part of the circuit used for transmission and reception processing between the first and second communication methods. Further, because the beam reference signal used for learning of the directionality is received after a certain time interval from completion of reception of the instruction signal that instructs learning, it is possible to switch the operation of the common part of the circuit from the first communication method to the second communication method during the time period.

4. Explanation of Third Embodiment

In the first and second embodiments described above, the optimum directionalities of transmitting and receiving beams when performing radio communication in accordance with the second communication method are determined based on the beam reference signal conforming to the second communication method. If it is assumed that the arrival direction of direct waves or reflected waves with the highest received power does not vary regardless of whether a transmission medium is millimeter waves or microwaves, the directionalities of transmitting and receiving beams may be learned by using microwaves (i.e. using the first communication method). As a third embodiment of the present invention, a configuration of a device which transmits and receives the instruction signal and the beam reference signal in accordance with the first communication method and learns the directionalities of transmitting and receiving beams is described hereinbelow. In this embodiment, a device at the transmitting end (Tx), which is described in relation to FIG. 1, is a communication device 500, and a device at the receiving end (Rx) is a communication device 600.

[4-1. Configuration of Transmitting Device]

Figure 16:
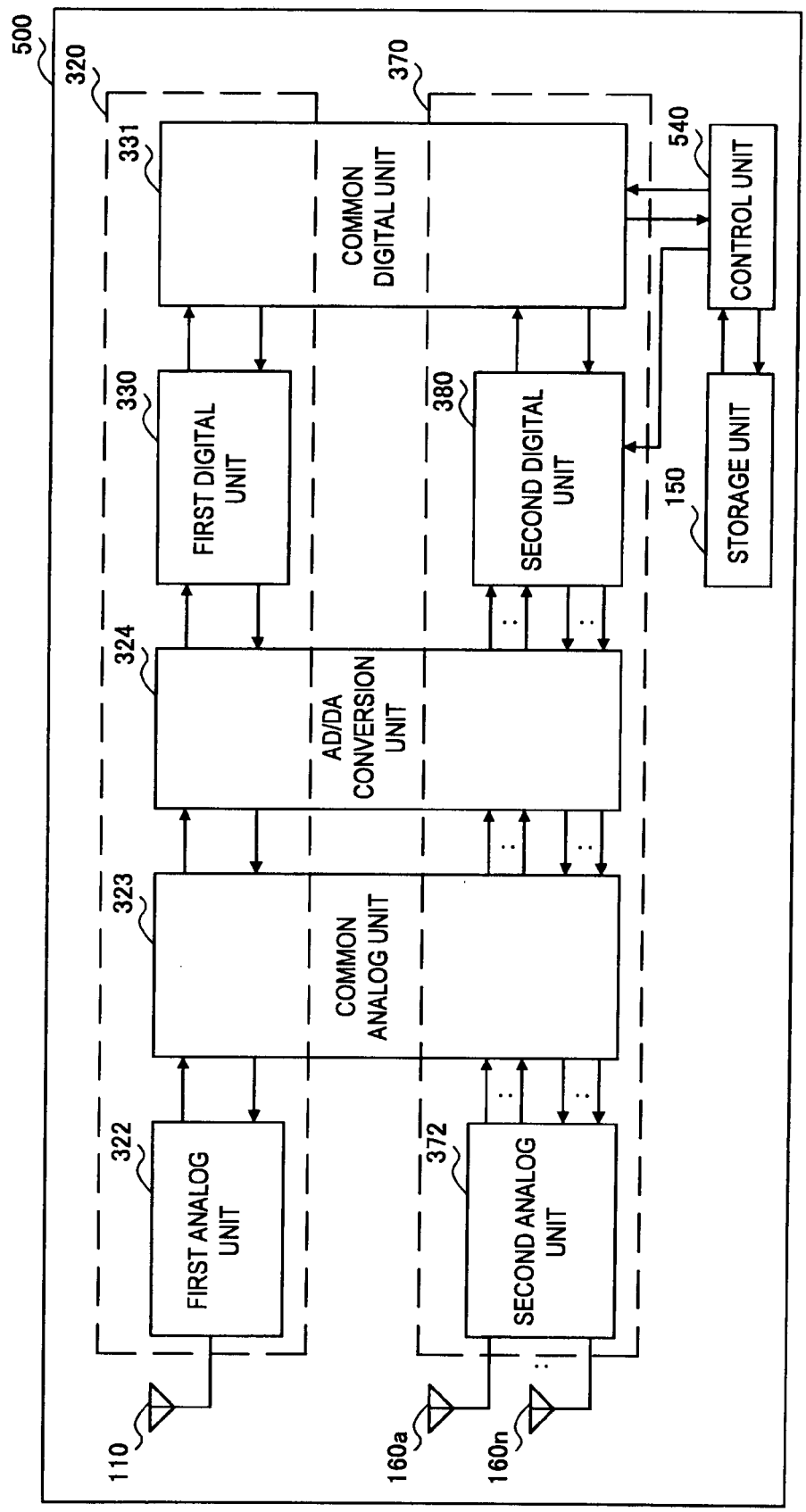
FIG. 16 is a block diagram showing an example of a configuration of a transmitting device according to a third embodiment.

FIG. 16 is a block diagram showing an example of a configuration of the communication device 500 according to the third embodiment of the present invention. Referring to FIG. 16, the communication device 500 includes an antenna 110, a first radio communication unit 320, a control unit 540, a storage unit 150, a plurality of antennas 160$a$ to 160$n$ and a second radio communication unit 370. The first radio communication unit 320 and the second radio communication unit 370 share the use of a common analog unit 323, an AD/DA conversion unit 324, and a common digital unit 331. Further, the first radio communication unit 320 includes a first analog unit 322 and a first digital unit 330. The second radio communication unit 370 includes a second analog unit 372 and a second digital unit 380.

The control unit 540 controls the overall operation of the first radio communication unit 320 and the second radio communication unit 370 by using an arithmetic unit such as a CPU, for example. The control unit 540 makes control to transmit an instruction signal which instructs to learn a beam directionality from the first radio communication unit 320 in response to a request from a given application, for example. Then, the control unit 540 makes control to transmit a beam reference signal used for learning of the directionality of a transmitting beam from the first radio communication unit 320 after completing transmission of the instruction signal and before receiving a response signal to the instruction signal, for example. Further, if a notification signal that notifies a learning result of the directionality is input from the first radio communication unit 320, the control unit 540 acquires a parameter value for specifying an optimum beam pattern contained in the notification signal. Then, the control unit 540 outputs a directionality control signal that contains the acquired parameter value to a receiving beam processing unit 382 or a transmitting beam processing unit 385 of the second digital unit 380.

Figure 17:
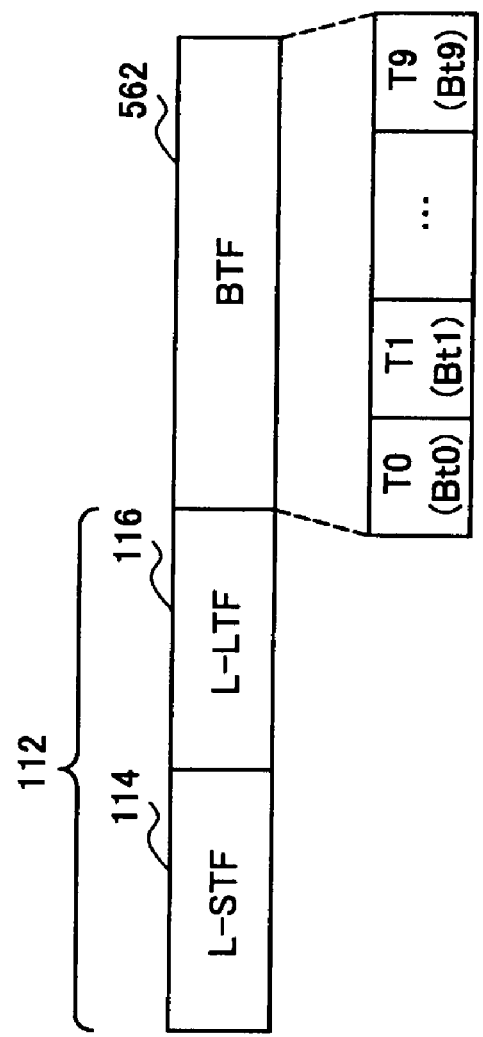
FIG. 17 is an explanatory view showing an example of formats of an instruction signal and a beam reference signal according to the third embodiment.

FIG. 17 is an explanatory view to describe the timing of transmitting the beam reference signal according to the embodiment.

Referring to FIG. 17, the instruction signal transmitted in accordance with the first communication method by the first radio communication unit 320 contains only a header portion 112 of the signal format conforming to the first communication method, as in the first and second embodiments.

On the other hand, the beam reference signal has BTF 562. In this embodiment, the BTF 562 is transmitted subsequent to the above-described instruction signal by the first radio communication unit 320 in accordance with the first communication method. The BTF 562 is composed of ten time slots T0 to T9 respectively corresponding to the transmitting beam patterns Bt0 to Bt9 shown in FIG. 4, for example, just like the BTF 162 according to the first embodiment and the BTF 362 according to the second embodiment. Accordingly, in a receiving device located in the vicinity of the communication device 500, a power level of a received signal has an outstanding value in any time slot of the beam reference signal according to the location, so that an optimum transmitting beam pattern can be determined. In this manner, an optimum transmitting beam pattern is determined based on the beam reference signal transmitted in accordance with the first communication method. Then, the determined optimum transmitting beam pattern is applied to a transmitting beam pattern when performing radio communication in accordance with the second communication method.

[4-2. Configuration of Receiving Device]

Figure 18:
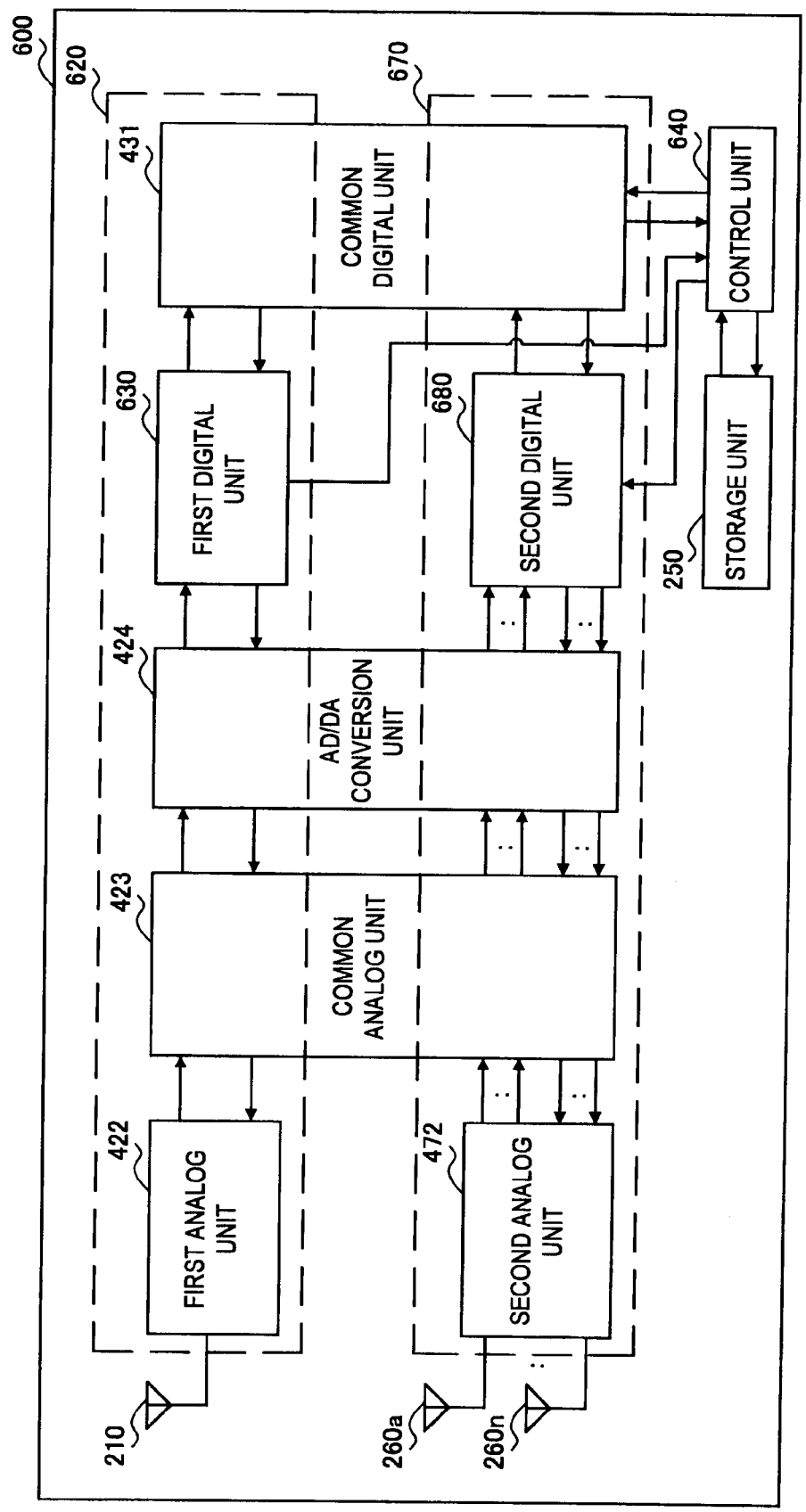
FIG. 18 is a block diagram showing an example of a configuration of a receiving device according to the third embodiment.

FIG. 18 is a block diagram showing an example of a configuration of the communication device 600 according to the third embodiment. Referring to FIG. 18, the communication device 600 includes an antenna 210, a first radio communication unit 620, a control unit 640, a storage unit 250, a plurality of antennas 260a to 260n and a second radio communication unit 670. The first radio communication unit 620 and the second radio communication unit 670 share the use of a common analog unit 423, an AD/DA conversion unit 424, and a common digital unit 431. Further, the first radio communication unit 620 includes a first analog unit 422 and a first digital unit 630. The second radio communication unit 670 includes a second analog unit 472 and a second digital unit 680.

Figure 19:
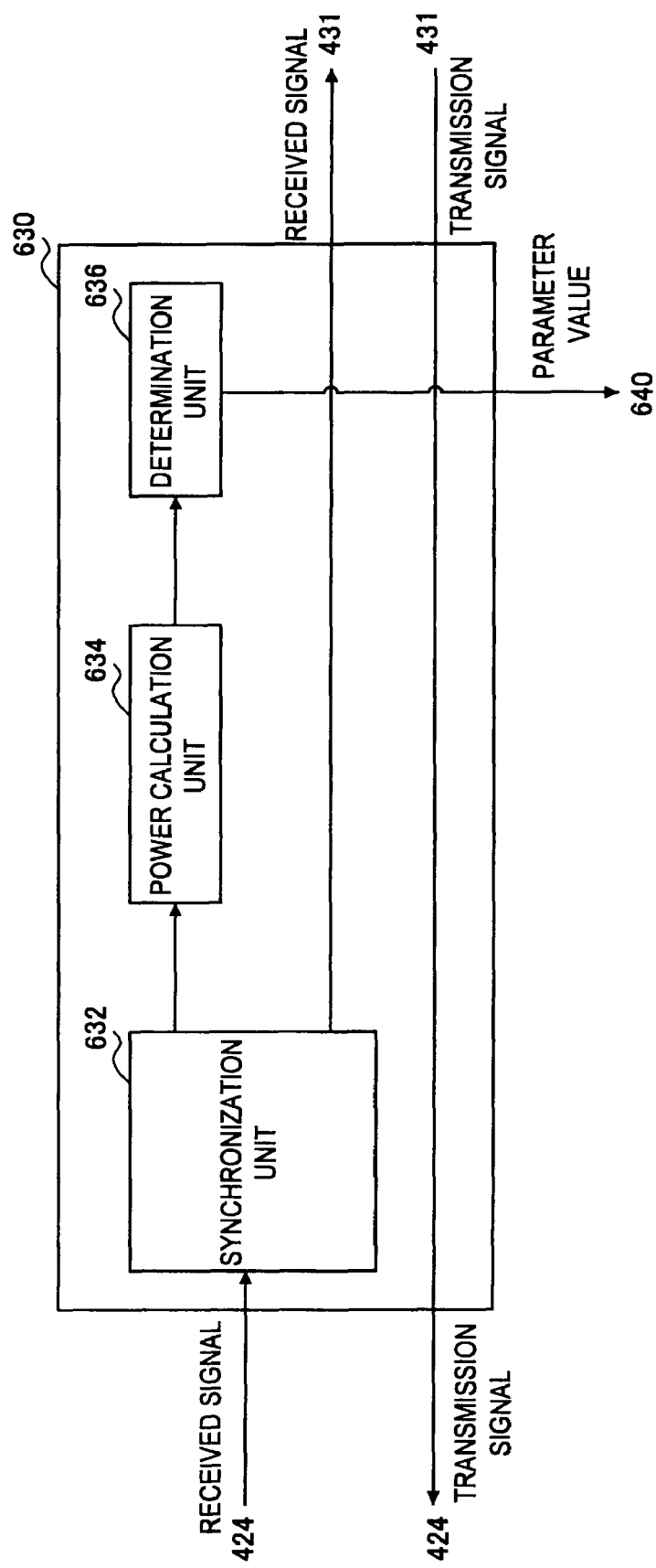
FIG. 19 is a block diagram showing an example of a specific configuration of a first digital unit in the receiving device according to the third embodiment.

FIG. 19 is a block diagram showing an example of a specific configuration of the first digital unit 630. Referring to FIG. 19, the first digital unit 630 includes a synchronization unit 632, a power calculation unit 634 and a determination unit 636.

The synchronization unit 632 detects a packet of a received signal received in accordance with the first communication method in accordance with a preamble at the head of the packet, for example. Then, the synchronization unit 632 outputs the received signal to the common digital unit 431. Further, if the first digital unit 630 detects the above-described instruction signal, it further detects the beam reference signal which is transmitted subsequent to the instruction signal, outputs the detected beam reference signal to the power calculation unit 634 and instructs calculation of a received power.

The power calculation unit 634 calculates received powers of the plurality of signal sequences contained the beam reference signal in response to an instruction from the synchronization unit 632. The plurality of signal sequences may be signal sequences respectively contained in the time slots T0 to T9 described in relation to FIG. 17 or signal sequences in orthogonal or pseudo orthogonal relation with one another described in relation to FIG. 10, for example. Then, the power calculation unit 634 sequentially outputs the calculated received powers to the determination unit 636.

The determination unit 636 determines a parameter value for specifying an optimum transmitting beam pattern based on the received power values input from the power calculation unit 634. The optimum transmitting beam pattern may be a transmitting beam pattern with which a series of received power values are maximum values, for example. Then, the determination unit 636 outputs the parameter value determined based on the received power values to the control unit 640.

The control unit 640 controls the overall operation of the first radio communication unit 620 and the second radio communication unit 670 by using an arithmetic unit such as a CPU, for example. If the optimum transmitting beam pattern is determined by the first radio communication unit 620, for example, the control unit 640 adds a parameter value for specifying the transmitting beam pattern to a notification signal and outputs it to the common digital unit 431 so as to transmit the notification signal from the first radio communication unit 620. Further, the control unit 640 may output a directionality control signal to the second digital unit 680 and controls a transmitting beam or a receiving beam of the communication device 600.

Figure 20:
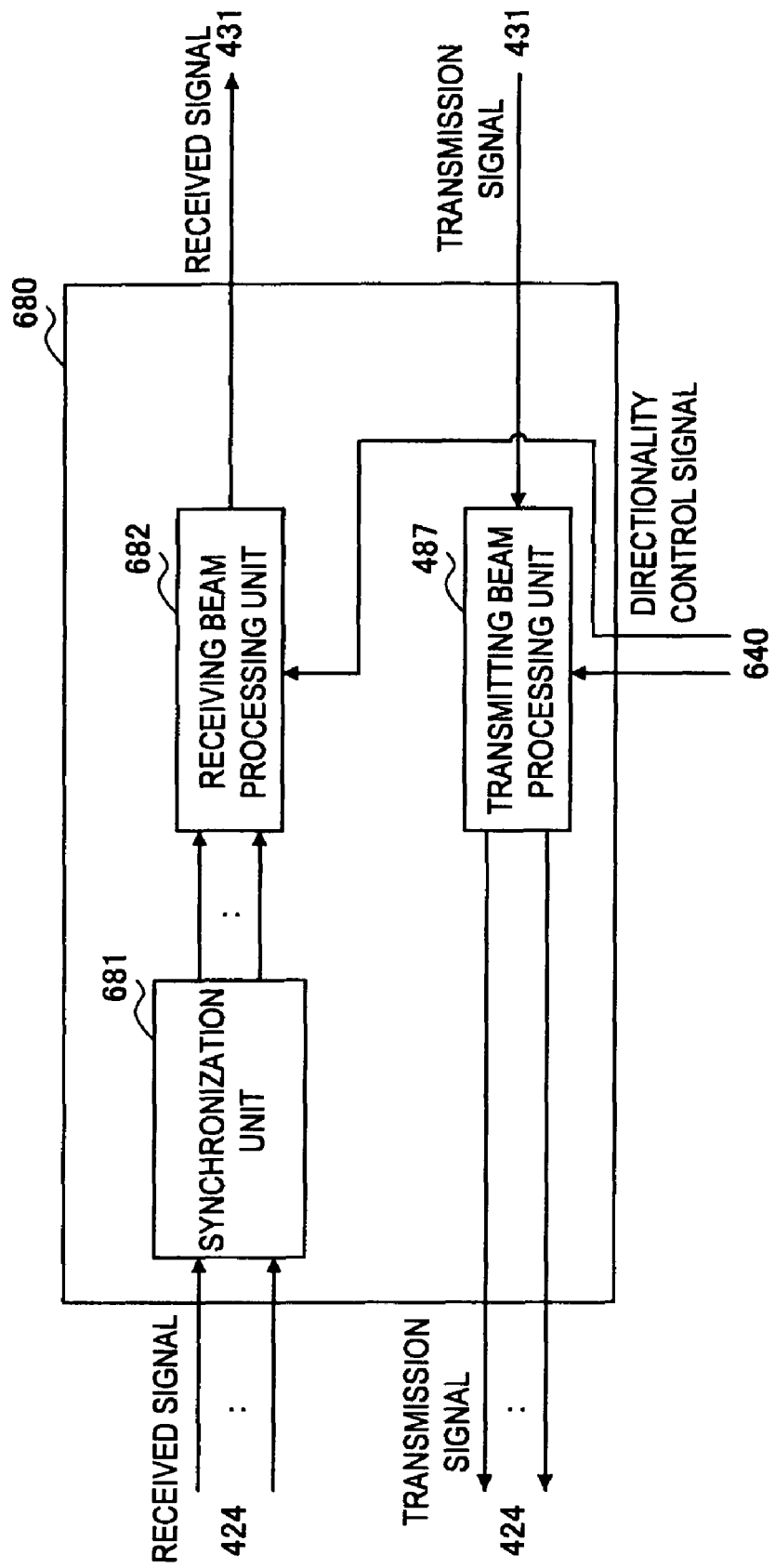
FIG. 20 is a block diagram showing an example of a specific configuration of a second digital unit in the receiving device according to the third embodiment.

FIG. 20 is a block diagram showing an example of a specific configuration of the second digital unit 680. Referring to FIG. 20, the second digital unit 680 includes a synchronization unit 681, a receiving beam processing unit 682 and a transmitting beam processing unit 487.

The synchronization unit 681 synchronizes the start timing of reception processing on a plurality of received signals received in accordance with the second communication method according to a preamble at the head of a packet, for example, and outputs the signals to the receiving beam processing unit 682.

The receiving beam processing unit 682 performs weighting processing of the plurality of received signals input from the synchronization unit 681 according to uniform distribution or Taylor distribution, for example, and thereby controls the directionality of a receiving beam. The receiving beam processing unit 682 then outputs the weighted received signal to the common digital unit 431.

[4-3. Example of Signal Transmitting and Receiving Sequence]

Figure 21:
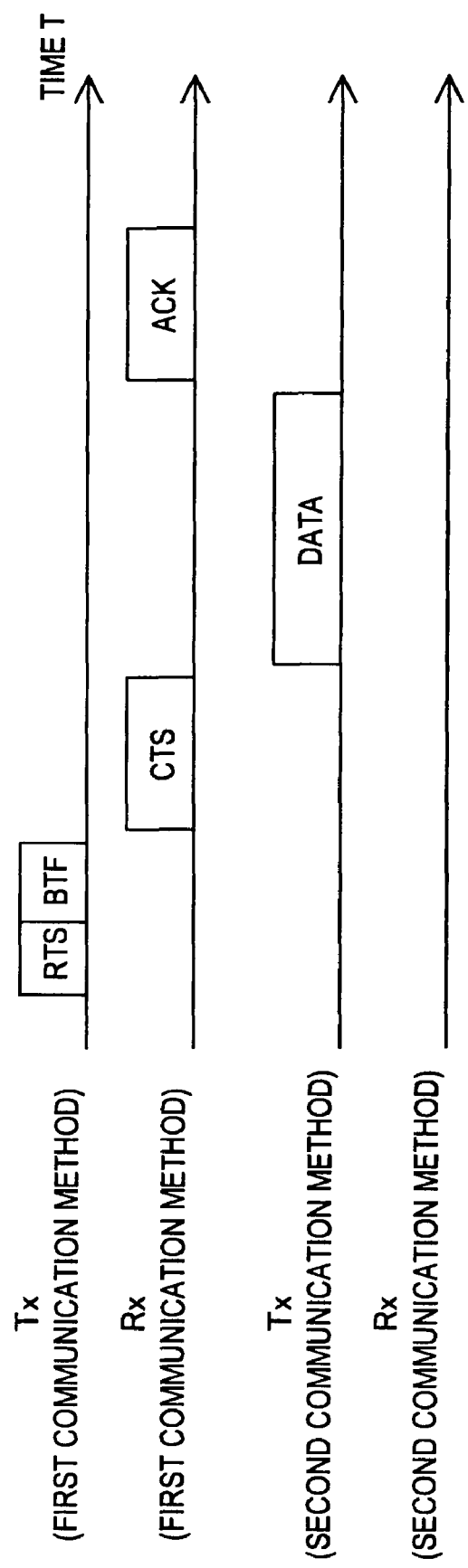
FIG. 21 is an explanatory view showing an example of a signal transmitting and receiving sequence according to the third embodiment.

FIG. 21 is an explanatory view showing an example of a sequence of signals transmitted and received between the communication device 500 and the communication device 600 described above. Referring to FIG. 21, signals transmitted from the communication device 500 (Tx) and the communication device 600 (Rx) are sequentially shown along the time axis.

First, the header portion of RTS conforming to the first communication method is transmitted from the first radio communication unit 320 of the communication device 500. The header portion of RTS corresponds to the above-described instruction signal. Next, subsequent to the header portion of RTS, BTF conforming to the first communication method is transmitted from the first radio communication unit 320 of the communication device 500. The BTF corresponds to the above-described beam reference signal. An optimum transmitting beam pattern when transmitting a signal from the communication device 500 to the communication device 600 is thereby determined in the first radio communication unit 620 of the communication device 600.

Next, CTS conforming to the first communication method is transmitted from the first radio communication unit 620 of the communication device 600. The data portion of the CTS contains a parameter value that specifies an optimum transmitting beam pattern, for example. In this case, the CTS corresponds to the above-described notification signal. If it is assumed that the arrival direction of direct waves or reflected waves with the highest received power does not vary regardless of a transmission medium as described earlier, a result of learning with use of the BTF conforming to the first communication method can be applied to radio communication in accordance with the second communication method. Accordingly, the communication device 500 can be notified from the above-described CTS about the optimum transmitting beam pattern when transmitting a signal to the communication device 600 in accordance with the second communication method. Note that the CTS transmitted from the communication device 600 to the communication device 500 may also serve as the above-described instruction signal. In this case, the header portion of CTS (i.e. the instruction signal) and BTF (i.e. the beam reference signal) are transmitted from the first radio communication unit 620 of the communication device 600 to the communication device 500.

After that, data is transmitted from the communication device 500 to the communication device 600 in accordance with the second communication method, and ACK (acknowledgement) is transmitted back from the communication device 600 to the communication device 500. At this time, because the optimum transmitting beam pattern determined by learning is used between the communication device 500 and the communication device 600, it is possible to transmit and receive data more reliably in accordance with the second communication method even with use of millimeter waves with high straightness and short electric wave attainment distance.

[4-4. Alternative Example]

In this embodiment, the first digital unit 630 of the communication device 600 may determine the direction where the communication device 500 is located by using MUSIC (Multiple Signal Classification) method, which is known as a kind of eigenvalue analysis, for example. When using the MUSIC method, the first digital unit 630 of the communication device 600 calculates a MUSIC spectrum depending on the direction where the communication device 500 is located based on the amplitude and phase of the received beam reference signal, for example. Next, the first digital unit 630 estimates the direction in which the calculated value of the MUSIC spectrum is largest as the direction where the communication device 500 is located. Then, the first digital unit 630 can determine the optimum directionalities of transmitting and receiving beams when performing radio communication in accordance with the second communication method according to the estimated direction.

5. Summary

The first to third embodiments of the present invention are described above with reference to FIGS. 1 to 21. In each embodiment, the reception start time point of the beam reference signal transmitted according to the first or second communication method is determined based on the instruction signal transmitted in accordance with the first communication method. Reception of the beam reference signal is started at the timing when the data portion omitted in the instruction signal is originally supposed to be received. Then, a parameter value for specifying an optimum beam pattern is determined based on the beam reference signal. It is thereby possible to learn optimum directionalities of transmitting and receiving beams used for radio communication in accordance with the second communication method during a time period in which one packet can be transmitted and received. Further, because a part of the circuit used for transmission and reception processing can be shared between the first and second communication methods, it is possible to suppress an increase in circuit scale and reduce manufacturing costs or reduce the device size, as in the second embodiment.

It should be noted that, although a configuration of a device at the transmitting end and a configuration of a device at the receiving end are described separately for convenience of description, a communication device which has both functions of the transmitting end and the receiving end may be configured as a matter of course.

Further, in this specification, the case of determining a beam pattern with a maximum received power as an optimum beam pattern in a device at the receiving end is described. Alternatively, however, a plurality of beam patterns with high received powers may be determined as candidates of a beam pattern to be used. Radio communication using millimeter waves can be thereby performed by the combined use of a plurality of beam patterns, for example.

Although preferred embodiments of the present invention are described in detail above with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-032029 filed in the Japan Patent Office on Feb. 13, 2009, the entire content of which is hereby incorporated by reference.

What is claimed is:

1. A communication device comprising:
   a first radio communication unit capable of radio communication in accordance with a first communication method; and
   a second radio communication unit capable of radio communication in accordance with a second communication method using a higher frequency band than the first communication method,
   wherein
   the first radio communication unit transmits an instruction signal instructing to learn a beam directionality to another communication device, and
   the second radio communication unit transmits a beam reference signal used for learning a beam directionality to said another communication device after completion of transmission of the instruction signal by the first radio communication unit and before reception of a response signal to the instruction signal.

2. The communication device according to claim 1, wherein
   the second radio communication unit transmits the beam reference signal after a prescribed time period has elapsed from completion of transmission of the instruction signal by the first radio communication unit.

3. The communication device according to claim 1, wherein
   the instruction signal contains only a header portion of a signal format conforming to the first communication method.

4. The communication device according to claim 1, wherein
   the beam reference signal is a signal containing plural signal sequences respectively associated with different directionality patterns.

5. The communication device according to claim 4, wherein
the beam reference signal is a signal containing plural time slots respectively corresponding to the plural signal sequences.

6. The communication device according to claim 4, wherein
the beam reference signal is a signal combining the plural signal sequences in orthogonal or pseudo orthogonal relation with one another.

7. The communication device according to claim 1, wherein
at least part of transmission processing of a radio signal in accordance with the first communication method and at least part of transmission processing of a radio signal in accordance with the second communication method are executed using a common circuit.

8. A communication device comprising:
a first radio communication unit capable of radio communication in accordance with a first communication method; and
a second radio communication unit capable of radio communication in accordance with a second communication method using a higher frequency band than the first communication method,
wherein
after the first radio communication unit transmits an instruction signal instructing to learn a beam directionality to another communication device, the first radio communication unit transmits a beam reference signal used for learning a transmitting beam directionality of the second radio communication unit to said another communication device before receiving a response signal to the instruction signal.

9. The communication device according to claim 8, wherein
the first radio communication unit further receives a notification signal containing a parameter value for specifying an optimum beam pattern determined based on the beam reference signal from said another communication device, and
the second radio communication unit performs radio communication with said another communication device by using a beam pattern specified by the parameter value contained in the notification signal.

10. A communication device comprising:
a first radio communication unit capable of radio communication in accordance with a first communication method; and
a second radio communication unit capable of radio communication in accordance with a second communication method using a higher frequency band than the first communication method,
wherein
upon receiving an instruction signal instructing to learn a beam directionality, the first radio communication unit determines a certain time point after completion of reception of the instruction signal and before transmission of a response signal to the instruction signal as a reception start time point of a beam reference signal, and
the second radio communication unit starts reception of the beam reference signal from the reception start time point determined by the first radio communication unit and determines a parameter value for specifying an optimum beam pattern based on the received beam reference signal.

11. The communication device according to claim 10, wherein
the reception start time point is a time point after a prescribed time period has elapsed from completion of reception of the instruction signal by the first radio communication unit.

12. The communication device according to claim 10, wherein
at least part of reception processing of a radio signal in accordance with the first communication method and at least part of reception processing of a radio signal in accordance with the second communication method are executed using a common circuit.

13. A communication device comprising:
a first radio communication unit capable of radio communication in accordance with a first communication method; and
a second radio communication unit capable of radio communication in accordance with a second communication method using a higher frequency band than the first communication method,
wherein
upon receiving an instruction signal instructing to learn a beam directionality, the first radio communication unit further receives a beam reference signal transmitted subsequent to the instruction signal and used for learning a transmitting beam directionality to be used for radio communication by the second radio communication unit, and determines a parameter value for specifying an optimum beam pattern based on the received beam reference signal.

14. The communication device according to claim 13, wherein
the first radio communication unit determines the parameter value for specifying an optimum beam pattern in accordance with eigenvalue analysis based on the beam reference signal.

15. A communication control method between a transmitting device and a receiving device capable of radio communication in accordance with a first communication method and a second communication method using a higher frequency band than the first communication method, comprising the steps of:
transmitting an instruction signal instructing to learn a beam directionality from the transmitting device to the receiving device in accordance with the first communication method;
transmitting a beam reference signal used for learning a beam directionality from the transmitting device to the receiving device in accordance with the second communication method after completing transmission of the instruction signal and before receiving a response signal to the instruction signal;
starting reception of the beam reference signal from a prescribed reception start time point determined based on the received instruction signal in the receiving device; and
determining a parameter for specifying a beam having an optimum directionality based on the received beam reference signal.

16. A communication system comprising a transmitting device and a receiving device respectively including:
a first radio communication unit capable of radio communication in accordance with a first communication method; and a second radio communication unit capable of radio communication in accordance with a second communication method using a higher frequency band than the first communication method, wherein the first radio communication unit of the transmitting device transmits an instruction signal instructing to learn a beam directionality to the receiving device, the second radio communication unit of the transmitting device transmits a beam reference signal used for learning a beam directionality to the receiving device after completion of transmission of the instruction signal by the first radio communication unit and before reception of a response signal to the instruction signal, upon receiving the instruction signal, the first radio communication unit of the receiving device determines a reception start time point of the beam reference signal based on the instruction signal, and the second radio communication unit of the receiving device starts reception of the beam reference signal from the determined reception start time point and determines a parameter value for specifying an optimum beam pattern based on the received beam reference signal.

* * * * *